United States Patent
Ito

(10) Patent No.: US 10,402,080 B2
(45) Date of Patent: Sep. 3, 2019

(54) INFORMATION PROCESSING APPARATUS RECOGNIZING INSTRUCTION BY TOUCH INPUT, CONTROL METHOD THEREOF, AND STORAGE MEDIUM

(71) Applicant: CANON KABUSHIKI KAISHA, Tokyo (JP)

(72) Inventor: Hikaru Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 712 days.

(21) Appl. No.: 14/958,229

(22) Filed: Dec. 3, 2015

(65) Prior Publication Data

US 2016/0162143 A1 Jun. 9, 2016

(30) Foreign Application Priority Data

Dec. 9, 2014 (JP) .................................. 2014-249425

(51) Int. Cl.
| | | |
|---|---|---|
| *G06F 3/048* | (2013.01) | |
| *G06F 3/0485* | (2013.01) | |
| *G06F 3/0488* | (2013.01) | |
| *G06F 3/0484* | (2013.01) | |
| *G06F 3/0483* | (2013.01) | |

(52) U.S. Cl.
CPC .......... *G06F 3/0485* (2013.01); *G06F 3/0483* (2013.01); *G06F 3/04845* (2013.01); *G06F 3/04883* (2013.01)

(58) Field of Classification Search
CPC .. G06F 3/0485; G06F 3/0483; G06F 3/04845; G06F 3/04883
See application file for complete search history.

(56) References Cited

U.S. PATENT DOCUMENTS

| | | | | |
|---|---|---|---|---|
| 2009/0289902 A1* | 11/2009 | Carlvik | ............... | G06F 3/04883 345/173 |
| 2010/0262905 A1* | 10/2010 | Li | .......................... | G06F 3/0482 715/702 |
| 2014/0115543 A1* | 4/2014 | Shimoni | ............. | G06F 3/04883 715/841 |

FOREIGN PATENT DOCUMENTS

JP 2006-146556 A 6/2006

* cited by examiner

*Primary Examiner* — Liliana Cerullo
(74) *Attorney, Agent, or Firm* — Canon USA, Inc., IP Division

(57) ABSTRACT

An information processing apparatus includes an obtainment unit configured to obtain an input position input to an input area, a display control unit configured to scroll at least a portion of an image displayed on a display screen in response to movement of an input position obtained by the obtainment unit, and a recognition unit configured to, if a shape of at least a portion of a locus constituted of input positions input after a first condition is satisfied forms a predetermined figure among movement loci of the input positions obtained by the obtainment unit, recognize an instruction corresponding to the figure, wherein, the display control unit does not scroll the image in response to movement of an input position input after the first condition is satisfied.

16 Claims, 12 Drawing Sheets

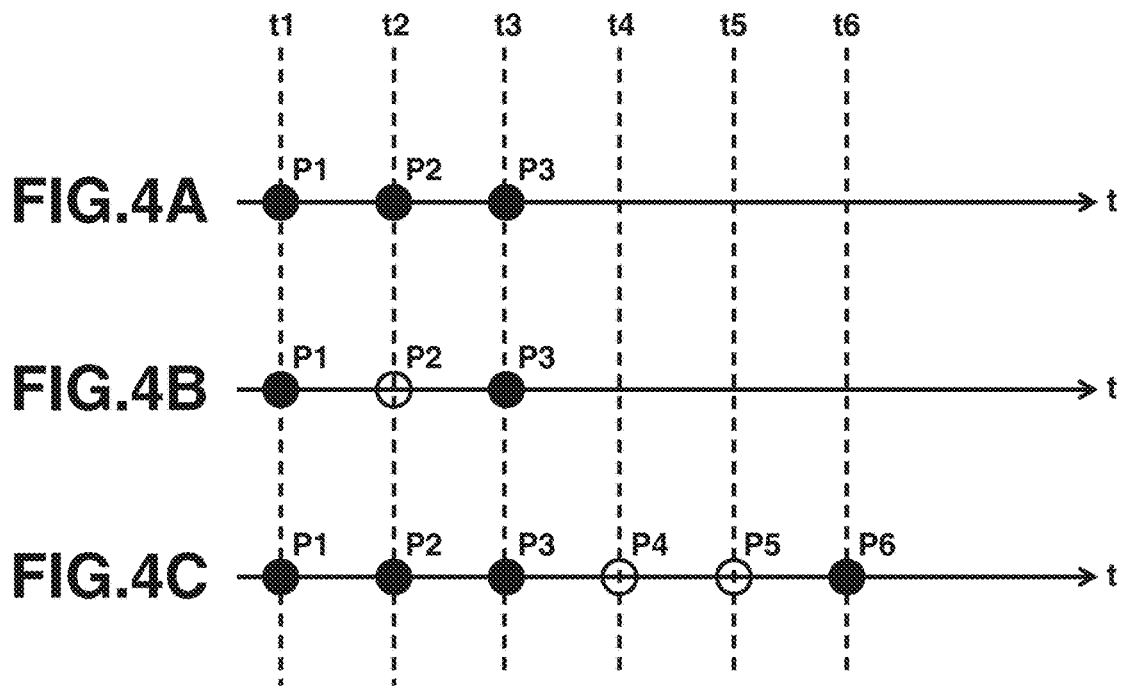

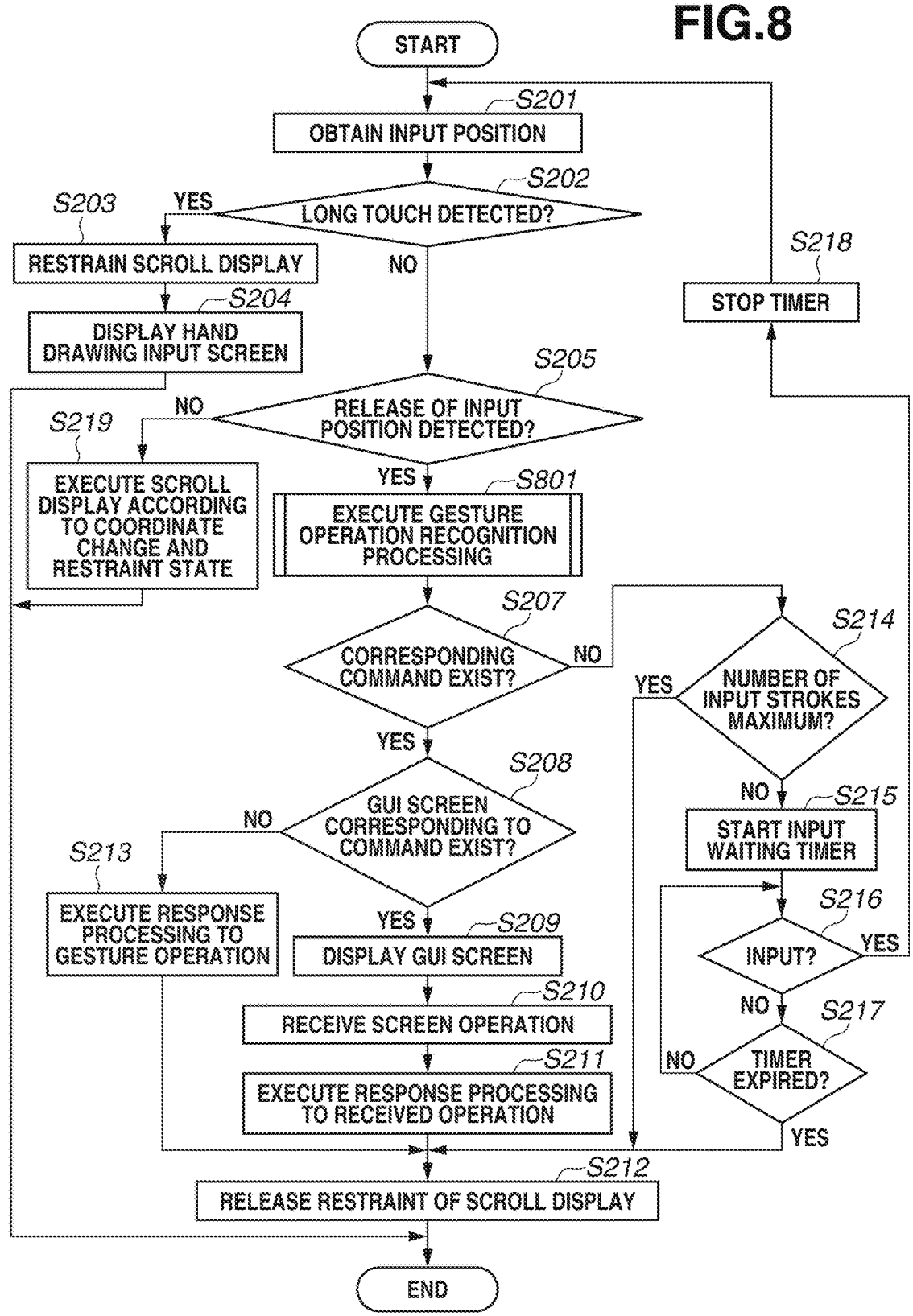

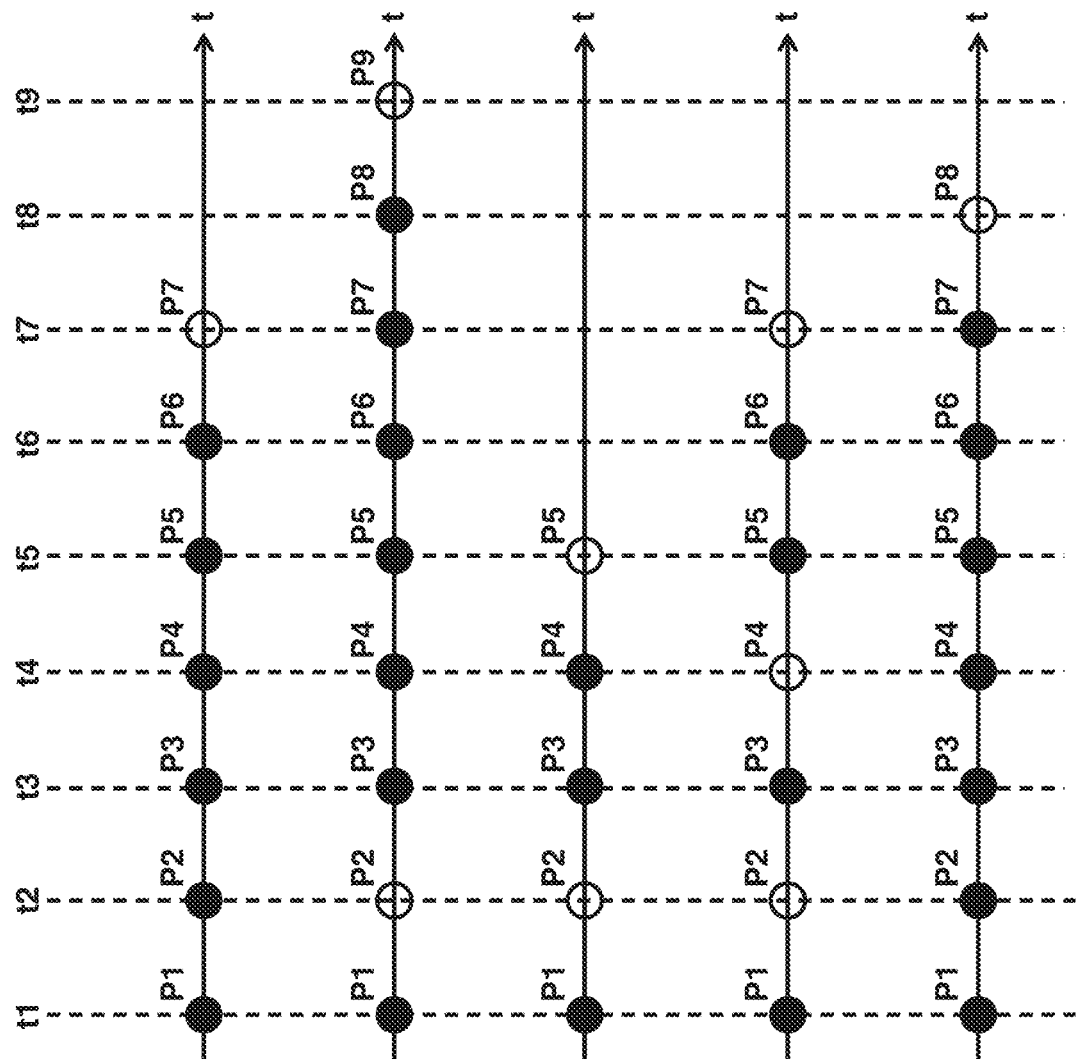

INFORMATION PROCESSING APPARATUS RECOGNIZING INSTRUCTION BY TOUCH INPUT, CONTROL METHOD THEREOF, AND STORAGE MEDIUM

BACKGROUND OF THE INVENTION

Field of the Invention

The present disclosure generally relates to information processing and, more particularly, to an information processing apparatus recognizing instruction by touch input, a control method thereof, a storage medium, and to a technique for recognizing an operation based on input of a position.

Description of the Related Art

Recently, touch input apparatuses have become widely used which obtain, in response to a touch on a screen with a user's finger or a stylus, X and Y coordinates of a touched position as an input value and recognize a touch operation by the user based on the input value. One of common touch operations is a scroll operation for moving an image by following movement of an input position. Further, some touch input apparatuses are provided with a function of recognizing a hand-drawn figure which recognizes, if a shape of a movement locus of input positions coincides with a predetermined shape, that the movement locus is input of a command corresponded to the predetermined shape in advance.

If the same screen can receive both of input by the scroll operation following the movement of the input position and input by the hand-drawn figure for recognizing a shape of the movement locus of the input positions, the movement of the input position needs to be recognized by distinguishing which movement is intended for.

Japanese Patent Application Laid-Open No. 2006-146556 describes a technique which sets two areas on a screen and determines whether to execute scroll following the movement of the input position or execute a gesture operation by recognizing a shape of the movement locus according to which area the input position is included in.

According to the method described in Japanese Patent Application Laid-Open No. 2006-146556, a user is limited to a position to touch according to an intended operation. However, there is a position easy or difficult to touch for the user depending on contents of a displayed image or a size of the screen, therefore, the limitation to the position to touch may decrease operation efficiency.

SUMMARY OF THE INVENTION

According to an aspect of the present disclosure, an information processing apparatus includes an obtainment unit configured to obtain an input position input to an input area, a display control unit configured to scroll at least a portion of an image displayed on a display screen in response to movement of an input position obtained by the obtainment unit, and a recognition unit configured to, if a shape of at least a portion of a locus constituted of input positions input after a first condition is satisfied forms a predetermined figure among movement loci of the input positions obtained by the obtainment unit, recognize an instruction corresponding to the figure, wherein, the display control unit does not scroll the image in response to movement of an input position input after the first condition is satisfied.

Further features of the present disclosure will become apparent from the following description of exemplary embodiments with reference to the attached drawings.

BRIEF DESCRIPTION OF THE DRAWINGS

FIGS. 4A to 4C are timing charts illustrating flows for obtaining a series of input positions.

FIG. 8 is a flowchart illustrating an example of a processing flow for recognizing a touch operation.

FIGS. 12A to 12E are timing charts illustrating flows for obtaining a series of input positions in operation examples.

DESCRIPTION OF THE EMBODIMENTS

Various exemplary embodiments for implementing the present disclosure will be described in detail below with reference to the attached drawings. It is to be noted that the exemplary embodiments described below are merely examples for specifically implementing the present invention and are not intended to limit the present disclosure.

Figure 1A:
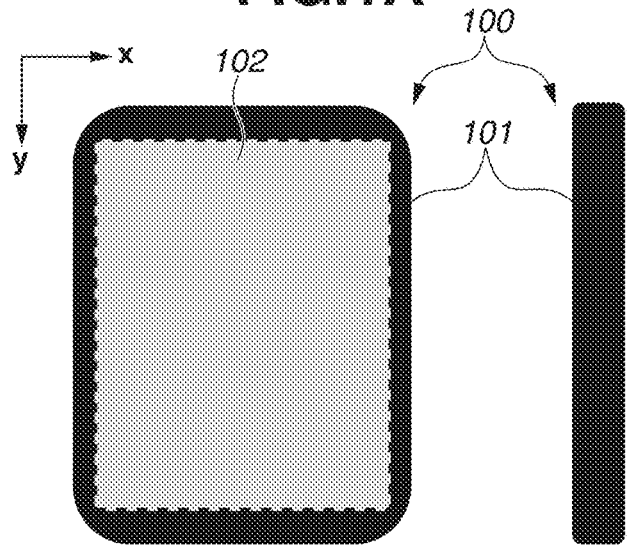
FIGS. 1A to 1C are examples illustrating an external appearance and configurations of an information processing apparatus.
Figure 1B:
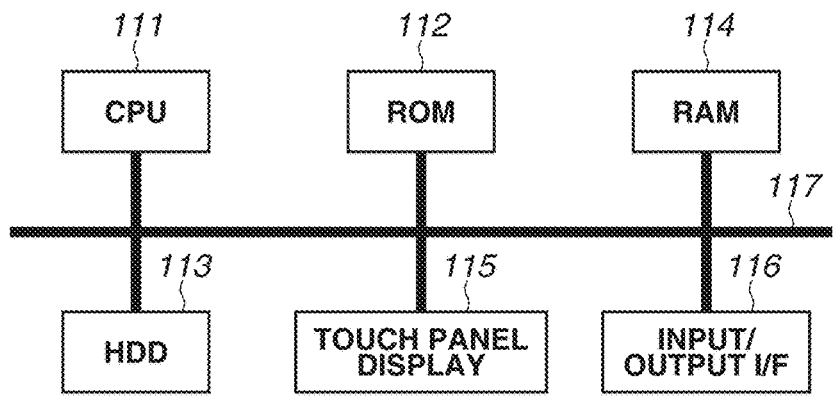
Figure 1C:
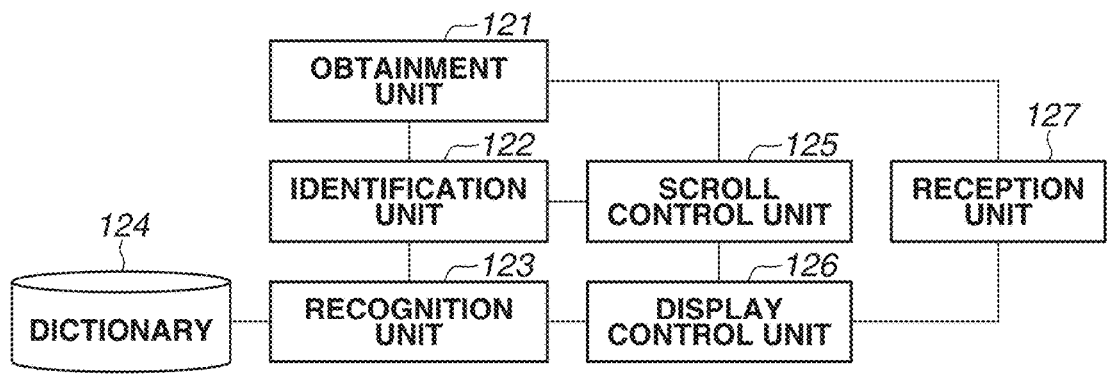

FIGS. 1A to 1C are examples illustrating an external appearance, a hardware configuration, and a software configuration of an information processing apparatus to which a first exemplary embodiment of the present disclosure can be applied.

FIG. 1A illustrates the external appearance of a portable terminal as an example of an information processing apparatus 100 viewed from a front and a side of a screen. In FIG. 1A, a housing 101 surrounds an outer periphery of an input area 102 and is made of synthetic resins, metals, and the like. The input area 102 is a target area where a user touches as a touch target and receives a touch input used for an operation input to the information processing apparatus 100. According to the present exemplary embodiment, the input area 102 is configured with a touch panel display in which a touch sensor is disposed on a display screen portion of a liquid crystal display as a display unit. The display screen is an interface displaying various images for operating the information processing apparatus 100 or other apparatuses connected to the information processing apparatus 100. According to the present exemplary embodiment, the input area 102 has resolution of 480 [dot]*640 [dot], and position information can be managed as a coordinate plane regarding an upper left of a sheet surface as an origin. According to the present exemplary embodiment, a portable terminal illustrated in FIG. 1A is described below as an example of the information processing apparatus 100. As used herein, the term "unit" generally refers to any combination of software, firmware, hardware, or other component, such as circuitry, that is used to effectuate a purpose.

In the information processing apparatus 100 according to the present exemplary embodiment, when a finger or the like is slidingly moved while touching on the display screen, at least a portion of a displayed image can be scrolled by following the movement. This operation is called a scroll operation. In a scroll operation, an operation target image can be slidingly moved by a movement amount based on a change amount of coordinates of touched positions before and after the movement regardless of a shape of a movement locus of the touched positions. The operation target image to be moved may be an entire image displayed on the display screen or a limited portion in the displayed image, such as a touched image and a content in a touched window. In the following descriptions, a fact that a touched position is changed by a user moving his/her finger or a stylus (hereinafter, referred to as an operation object) is described as "a touched position (an input position) is moved" for short.

According to the present exemplary embodiment, the information processing apparatus 100 can receive a scroll operation and also receive a command input by drawing a predetermined figure by hand. This operation is called a gesture operation, a hand drawing gesture operation, a touched gesture operation, and the like. As an example of a command input by a hand-drawn figure, when a locus with a shape of a triangular mark is drawn on a screen in which only one image is displayed, a command to instruct screen transition to a list screen of a plurality of thumbnail images can be input. Further, when a locus with a shape of a cross mark is drawn on a screen in which one image is displayed, a command to instruct deletion of the displayed image can be input. Further, when a locus with a shape of a circle mark is drawn on a screen in which one image is displayed, attribute information indicating that the displayed image is a favorite can be added thereto. The commands by the hand-drawn figures described above are examples, and various instruction contents can be corresponded to loci with various shapes. According to the present exemplary embodiment, correspondence relationships between predetermined figure shapes and contents of commands are stored as a dictionary in advance, however, the dictionary can be updated by a user operation and a download via a network. In the present specification described below, "locus" is a collective term of a plurality of input positions which are input by sliding a finger and the like while touching and connected with one another in the input order. However, like a cross mark, when second and subsequent strokes are drawn by releasing a touch in the middle of input, each locus is individually called a "stroke". In other words, a triangular mark is a locus constituted of one stroke, and a cross mark is loci constituted of two strokes.

As described above, the information processing apparatus 100 according to the present exemplary embodiment can receive, by the same screen, both of an operation regardless of a shape of the movement locus of the touched positions such as a scroll operation and an operation in which a shape of the movement locus of the touched positions has a meaning such as a gesture operation. To receive the both operations by the same screen means that both operations arbitrarily input to a screen being continuously displayed can be received without switching screens or modes. It is troublesome for a user if an image is scrolled and moved while inputting an operation in which a shape of the movement locus of the touched positions has a meaning, since a movement amount of the touched position becomes difficult to understand or an operation target image becomes difficult to identify. Therefore, according to the present exemplary embodiment, among movement loci of detected touched positions, a touch portion to be a target of shape recognition processing is limited to a portion of a locus constituted of touched positions moved after a long touch is input immediately after the start of the touch. In addition, while the input position is moved after the long touch is input (while the movement of the touched position is performed with the intention to draw a hand-drawn figure), the image is controlled not to be subjected to the scroll display if the touched position is moved. A long touch is that a state in which a movement amount of a touched position is kept small and the touched position can be regarded as remaining stationary is continued for a predetermined time period.

An operation regardless of a shape of a movement locus of touched positions to be distinguished from input of a hand-drawn figure is not limited to scroll. For example, a pinch operation for instructing magnification and reduction of an image by changing a distance between two touched positions and a rotation operation for rotating an image by relatively rotating two touched positions can be included. Reception of a scroll operation is described below as an example of an operation for adding a change to a displayed image based on not a shape of the movement locus of the touched positions but a change amount of coordinates regardless of a shape of the movement locus of the touched positions.

FIG. 1B is an example of a block diagram illustrating a hardware configuration of the information processing apparatus 100 to which the present exemplary embodiment can be applied. In FIG. 1B, the information processing apparatus 100 includes a central processing unit (CPU) 111. The information processing apparatus 100 further includes a read only memory (ROM) 112 and a hard disk drive (HDD) 113. According to the present exemplary embodiment, the CPU 111 reads and executes a control program stored in the ROM 112 and the HDD 113 to control each device. The control program is a control program for causing the information processing apparatus 100 to execute various operations indicated in flowcharts and the like described below. The ROM 112 stores the control programs and various data pieces used in the programs. A random access memory (RAM) 114 includes a work area for the above-described programs of the CPU 111, a data save area when error processing is performed, a load area for the above-described control program, and the like. The HDD 113 stores the above-described various programs and various data pieces. According to the present exemplary embodiment, an image group such as pictures to be displayed on a screen as an operation target is stored in the HDD 113.

A touch panel display 115 is a device serving as a touch sensor and the like for receiving information of a user operation on the input area 102 and a display screen for outputting display. The touch panel display 115 detects a touched portion when the input area 102 is touched with a human finger and the like and identifies the touched position as a coordinate point on a coordinate plane defined on the input area 102. When the touched portion has an area, coordinates of its center of gravity of a center point is identified. In the following descriptions, the relevant point is referred to as an input position. An input position can be detected with respect to each of one or more touched portions which are regarded as independent from one another among one or more touched portions detected on the touch panel. For example, when the touch panel is touched with a plurality of fingers, there is a plurality of independent touched portions, and thus a plurality of input positions are detected. In other words, the touch panel display 115 according to the present exemplary embodiment can perform multi-touch detection and detect all of one or more input positions instructed at the same time. For a detection method of a touch, various types of touch panels can be used, such as a resistive film type, a capacitance type, an infrared type, an ultrasonic type, an acoustic wave type, a vibration detection type, and the like. In addition, whether an input target surface is touched or not is detected by a device which can detect a position in a three-dimensional space, such as a distance image sensor and a stereo camera, and position information defined on the target surface may be obtained. Further, position (proximity position) information at a position in a proximity state obtained by a detection unit which can detect position information of a user's finger which does not touch but is close to a surface of the information processing apparatus can be used as an input position. According to the present exemplary embodiment, an input position is detected as a single coordinate point but not limited to this. An entire touched portion having an area may be regarded as an input position, or, for example, the input area 102 is divided into touch areas in an array, and area identification information indicating in which area a touch is detected can be regarded as an input position.

An input/output interface (I/F) 116 is an interface used for obtaining input information and outputting various information pieces from and to an external device connected via the network and the like. A bus 117 is used for transferring an address signal instructing a component as a control target of the CPU 111, a control signal controlling each component, and data exchanged between each component. The above-described control programs may be stored in advance in the ROM 112 or the HDD 113 or may be received from an external device via the network if necessary and stored in the ROM 112 or the HDD 113.

FIG. 1C is an example of a block diagram illustrating a software configuration of the information processing apparatus 100. Each function unit is realized by the CPU 111 expanding a program stored in the ROM 112 on the RAM 114 and executing processing according to each flowchart described below. Further, for example, when the hardware is configured as an alternative of the software processing using the CPU 111, arithmetic units and circuits corresponding to processing of each function unit described herein may be configured.

An obtainment unit 121 obtains information regarding an input position touched with a user's finger or a stylus on the input area 102 based on a signal notified from the touch sensor of the touch panel display 115. However, the obtainment of the input position includes a case when the user's finger, the stylus, and the like are not necessarily in a contact state with the input area and information of a position (proximity position) indicated as a proximity state is obtained. The touch sensor used in the present exemplary embodiment notifies of information regarding the input position one each in turn even if a plurality of input positions is touched at the same time (namely, a multi-touched state). The notified information regarding the input position is stored in the RAM 114. The information regarding the input position includes, for example, the coordinate information indicating the input position in the input area 102, a detected time when the input position is detected, identification (ID) indicating the detected order, and a touch event.

The touch event is information indicating a type of touch information to be notified. According to the present exemplary embodiment, when the touch information corresponding to a case that an operation object newly touches the input area or a case that the touch is continued is notified, an event "TOUCH" is notified. Further, when the touch information corresponding to a case that the operation object is released from the touch panel is notified, a touch event "RELEASE" is notified. Release of the input position means that, for example, a user's finger operating on the touch panel display 115 is separated therefrom, and the touch with the finger is no longer detected. In other words, "RELEASE" is information indicating that the touch is no longer detected. In the case of the touch event "TOUCH", information to be notified includes the coordinate information indicating the input position touched with the operation object. In the case of the touch event "RELEASE", the operation object does not touch the input area, and thus information about the coordinates of the touched position is not obtained. However, according to the present exemplary embodiment, the proximity position detected when or immediately after the "RELEASE" event is notified is obtained as a release position. According to the present exemplary embodiment, the touch event includes ID for identifying the input position. When a touch panel which does not detect the proximity position is used or the like, the coordinates of the touched position detected immediately before the "RELEASE" event is notified may be obtained as the release position. A coordinate detection period of the sensor is sufficiently shorter as compared with movement of a human finger. Therefore, an error of the touched position detected immediately before actual release can be regarded as very small with respect to an actual release position. An identifier associated with a detected order of the input position is used for the ID, so that management becomes easier when a plurality of input positions is detected. According to the present exemplary embodiment, the obtainment unit 121 detects the latest information of the input position based on the ID and can detect that the input position is moved based on the input position with the same ID is detected at a position different from a position previously detected. However, the present exemplary embodiment may be applied to a detection system in which a touch event "MOVE" is notified when the touch information corresponding to a case when the input position with the same ID is detected at a position different from a position previously detected is notified.

An identification unit 122 identifies input position candidates constituting a hand-drawn figure in the movement locus of the obtained input positions based on the information regarding the input positions obtained by the obtainment unit 121. In other words, the identification unit 122 identifies a portion to be a target of processing for recognizing a shape of the movement locus so as to interpret the movement locus as a command input among the movement loci of the obtained input positions. According to the present exemplary embodiment, the identification unit 122 determines that a long touch is input based on the information obtained by the obtainment unit 121 and stored in the RAM 114 and identifies the input position input after the input of the long touch as the input position to be a target of the processing for recognizing the shape of the movement locus. In other words, it is identified that the input position input after the input of the long touch is not intended to a scroll operation but the input position candidate constituting a figure.

A recognition unit 123 identifies a shape of an input hand-drawn figure based on information of the input position identified by the identification unit 122 and information stored in advance as the dictionary 124, and recognizes the input hand-drawn figure as a command input corresponded to the identified shape in advance. However, if the identification unit 122 identifies the input position as the input position candidate constituting the figure, there is a case that the input position does not always coincide with the information in the dictionary 124, and a recognition result that a shape cannot be recognized is obtained. According to the present exemplary embodiment, the dictionary 124 is information in which shape information forming a triangular mark, a cross mark, and a circle mark is corresponded to a command which can be instructed to the information processing apparatus 100 and is stored in advance in the HDD 113 and read to the RAM 114 and referred by the CPU 111.

A scroll control unit 125 controls whether to restrain the scroll display following the movement of the input position according to whether the input position obtained by the obtainment unit 121 is to be a target of the shape recognition as a hand-drawn figure. According to the present exemplary embodiment, if it is determined that a long touch is input in response to the processing by the identification unit 122, the scroll display is restrained, and the restraint is released during when a long touch is not input or after recognition of the hand-drawn figure is complete. When the scroll display is not restrained, the scroll control unit 125 identifies a movement amount of an image as a scroll operation target based on a change amount of the coordinates of the input position obtained by the obtainment unit 121 and notifies a display control unit 126 of the movement amount.

The display control unit 126 controls a content to be displayed on the display screen by generating drawing data to which a result of processing by each function unit executed in response to a user operation is reflected and outputting the drawing data to the touch panel display 115. For example, the display control unit 126 generates drawing data for displaying a response result of the information processing apparatus 100 with respect to a command corresponding to the shape of the hand-drawn figure recognized by the recognition unit 123. Alternatively, the display control unit 126 performs scroll display of a target image displayed in accordance with a notification from the scroll control unit 125. A reception unit 127 receives a touch operation to a graphical user interface (GUI) screen displayed on the display screen. The GUI screen is an image including a display item such as an icon which can instruct issuance of a corresponding command when being touched. The reception unit 127 identifies a command instructed by the touch operation based on the coordinates of the input position obtained by the obtainment unit 121 and the position information of the display item on the screen and notifies each function unit related to the response of the identified command.

Next, a processing flow for recognizing a touch operation according to the present exemplary embodiment is described with reference to a flowchart illustrated in FIG. 2. According to the present exemplary embodiment, a series of processing described below is started in response to that the information processing apparatus 100 is turned on and repeated at a predetermined period while the information processing apparatus 100 is activated. However, a trigger to start the series of processing is not limited to this, and the processing for recognizing a touch input may be started in response to release of a lock of the apparatus, a start of a specific application, or completion of drawing of a specific image on the display screen.

In step S201, the obtainment unit 121 obtains information regarding the input position instructed on the input area 102 based on a signal notified from the touch panel display 115. The obtainment unit 121 obtains information regarding the coordinates of the input position and the detected time based on the information obtained from the touch sensor and stores the information in the RAM 114.

Next, in step S202, the identification unit 122 determines whether a long touch is detected based on the information regarding the input position stored in the RAM 114. According to the present exemplary embodiment, the identification unit 122 determines whether that a long touch is input immediately after the start of the touch can be determined based on the latest input position (the last obtained input position). A "long touch" is a term describing that an input state is maintained for a certain period, and it does not matter whether a pressing force is applied to the input position in the long touch. Generally, a condition of determining "whether a long touch is input" is that the input position remains in a predetermined range for a predetermined time length. The predetermined range is, for example, an inside of a circle with a radius d1 [dot] centering on the coordinates of the input position initially touched.

Figure 3A:
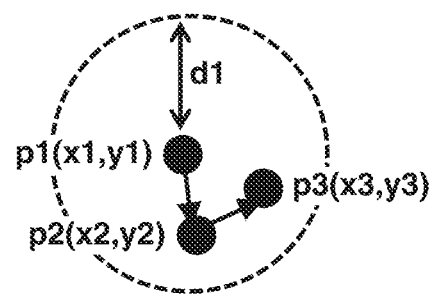
FIGS. 3A to 3C illustrate states of obtaining input positions to be a trigger to restrain scroll display.

A determination method of a long touch is described with reference to FIG. 3A and FIG. 4A. FIG. 3A illustrates a series of the coordinates of the input positions obtained during a long touch, and FIG. 4A is a timing chart indicating timings when the input positions are obtained during the long touch. In FIG. 3A, a position p1 is an input position initially touched at the start of the touch, and the inside of the circle with the radius d1 centering on the position p1 (a circle indicated by a dashed line) is regarded as the predetermined range. In this regard, a duration time of input for defining a long touch is T [msec]. When the duration time T is expressed as t2−t1<T<t3−t1, in the case of the example in FIG. 3A, it is determined that the long touch is detected at a time point when an input position p3 is obtained at a time t3. Regarding a method for defining a predetermined range, the predetermined range is not limited to a range of a circle with a specified radius, and, for example, may be a rectangular range in which a change amount of each of the X coordinate and the Y coordinate is included within d2 [dot].

If the input position is moved earlier than a lapse of the predetermined time from the start of the touch, it is determined that a long touch is not input. According to the present exemplary embodiment, in such a case, it is regarded that the input position is highly likely to be moved for a touch operation regardless of a shape of the movement locus of the input positions, such as scroll. In addition, according to the present exemplary embodiment, in the case that input is continued without being released after it is at least once determined that the long touch is input immediately after the start of the touch, if the latest coordinates are moved from the coordinates of the input position immediately before that, a determination result in step S202 will be NO. The fact that the long touch is input immediately after the start of the touch means that the long touch can be already determined before the latest input position is obtained. According to the present exemplary embodiment, it is regarded that movement in a state in which the input position is continuously detected without being released after the long touch is input immediately after the start of the touch is highly likely movement to input a hand-drawn figure. The identification unit 122 identifies input positions as the input position candidates constituting a hand-drawn figure as targets of the shape recognition processing and stored information thereof in the RAM 114.

If it is determined that the long touch is input immediately after the start of the touch (YES in step S202), the processing proceeds to step S203. Whereas if it is not determined that the long touch is input immediately after the start of the touch (NO in step S202), the processing proceeds to step S205.

In step S203, the scroll control unit 125 restrains execution of processing for scrolling an image by following the movement of the input position. During the restraint of the scroll display, the scroll control unit 125 notifies the display control unit 126 of not a signal for instructing to slidingly move the image but an instruction to display a hand drawing input screen.

In step S204, the display control unit 126 generates and outputs drawing data for causing the touch panel display 115 to display the hand drawing input screen thereto. According to the present exemplary embodiment, a gray area is displayed by overlapping on an original display content of the display screen as the hand drawing input screen so as to indicate to a user that a hand-drawn figure can be input. Accordingly, the user can recognize that the information processing apparatus 100 is shifted to a hand drawing input mode for receiving a hand-drawn figure. When displaying of the hand drawing input screen is complete, a series of the processing is terminated. The processing is repeated again from step S201 while the information processing apparatus 100 is activated. The gray area displayed in step S204 is a rectangular area with a gray-based transparent color, and it can be said that an area in which a gray transparent object is displayed in the front of the display screen. A size of the gray area coincides with a maximum size of the display screen. In other words, it seems for a user that a screen becomes uniformly dark.

In step S205, the identification unit 122 determines whether the touch is released based on the information of the input position obtained by the obtainment unit 121. More specifically, if a touch event "RELEASE" is obtained as the information regarding the latest input position, it is determined that the input position is released. If it is determined that the input position is released for the hand drawing input (YES in step S205), the processing proceeds to step S206. Whereas if it is not determined that the input position is released (NO in step S205), the processing proceeds to step S219.

Next, in step S206, the recognition unit 123 performs shape recognition of a locus connecting the input positions in the input order based on the information regarding the input position which is identified by the identification unit 122 as the target of the shape recognition processing and accumulated in the RAM 114. According to the present exemplary embodiment, shape information pieces of loci, such as a triangular mark, a cross mark, and a circle mark, corresponding to commands which can be instructed to the information processing apparatus 100 are stored in advance in the dictionary 124. The recognition unit 123 recognizes which shape stored in the dictionary 124 is regarded as coincident with the locus connecting the input positions and identifies the shape regarded as being coincident. Specific contents of the recognition processing are describe below with reference to specific examples illustrated in FIGS. 5A and 5B. In step S207, the recognition unit 123 determines whether the shape corresponding to the input locus is identified from the information pieces stored in advance in the dictionary 124 by the recognition processing executed in step S206. In other words, the recognition unit 123 determines whether the command corresponding to the input locus is present in the information pieces stored as the dictionary 124. If it is determined that the command corresponding to the input locus is present (YES in step S207), the processing proceeds to step S208. Whereas if it is determined that the command corresponding to the input locus is not present (NO in step S207), the processing proceeds to step S214.

In step S208, the recognition unit 123 determines whether a GUI screen is present which is to be displayed on the display screen in response to a notification of the command corresponding to the input locus. According to the present exemplary embodiment, when a gesture with a shape of a cross mark corresponding to the deletion command of a displayed image is input, a GUI screen is displayed for confirming whether to execute deletion of the image in response to the gesture. For example, a screen prompting a user to touch a "Yes" button or a "No" button is displayed. In contrast, when a gesture with a shape of a triangular mark for instructing the screen transition to the list screen of a plurality of thumbnail images is input, the command is immediately executed without displaying a GUI screen for confirmation.

If a GUI screen displayed in response to the command is present, correspondence information thereof is stored in advance in the dictionary 124. The recognition unit 123 perform determination with reference to the correspondence information. If it is determined that the GUI screen displayed in response to the command is present (YES in step S208), the processing proceeds to step S209. Whereas if it is determined that the GUI screen displayed in response to the command is not present (NO in step S208), the processing proceeds to step S213.

In step S209, the display control unit 126 displays the GUI screen corresponding to the input hand-drawn figure in response to the instruction notified from the recognition unit 123. On this occasion, the gray area on the display screen displayed in step S204 may be deleted. For example, in the case of a cross mark, the display control unit 126 generates an image to pop up a confirmation screen of whether to delete the image and outputs the image to the touch panel display 115.

Next, in step S210, the reception unit 127 receives a user operation on the GUI screen displayed in step S209. For example, when the confirmation screen of whether to execute deletion of the image is displayed, the user touches a "Yes" button when wanting to execute the deletion and touches a "No" button when not wanting to execute the deletion. The reception unit 127 identifies which button is touched based on the coordinates of the input position.

Next, in step S211, the reception unit 127 notifies each function unit in the CPU 111, such as the display control unit of the operation received in step S210, and each function unit executes response processing to the user operation. For example, if the "Yes" button is touched on the confirmation screen of whether to execute deletion of the image, the CPU 111 deletes the image displayed on the screen from the HDD 113. Whereas if the "No" button is touched, the image is not deleted.

Next, in step S212, the scroll control unit 125 releases the restraint of the scroll display. If the input position detected after the processing in step S212 is moved with no long touch, the scroll control unit 125 determines a movement amount of a target image of the scroll operation based on a change amount of the coordinates and notifies the display control unit 126 of the movement amount. If the gray area on the display screen displayed in step S204 is still displayed at the time point of the processing in step S212, the display control unit 126 deletes the gray area. The processing is repeated again from step S201 while the information processing apparatus 100 is activated.

Whereas if it is determined as NO in step S208, the processing proceeds to step S213, and the recognition unit 123 recognizes that an instruction command corresponded to the shape of the hand-drawn figure recognized in step S206 is input. Subsequently, the various function units in the CPU 111 receiving the command notification input from the recognition unit 123 execute the response processing to the operation command corresponding to the input locus. For example, in the case that a locus of a triangular mark is input, the display control unit 126 generates the drawing data for displaying the list screen of a plurality of thumbnail images and outputs the drawing data to the touch panel display 115.

In addition, if it is determined as NO in step S207, the processing proceeds to step S214, and the identification unit 122 determines whether the number of strokes constituting the locus of the input positions identified as the target of the shape recognition processing is a maximum number of the number of strokes stored in advance in the dictionary 124. A stroke is constituted of a series of input positions from an input position first notified with a "TOUCH" event to an input position notified with a "RELEASE" event. In other words, the number of input strokes is counted up every time a notification of the "RELEASE" event is received. The number of strokes of a triangular mark is "1", and the number of strokes of a cross mark is "2". For example, if these two figures are stored in the dictionary 124, the maximum number of strokes is "2". If it is determined that the number of input strokes is the maximum number of strokes (YES in step S214), the processing proceeds to step S212. Whereas if it is determined that the number of input strokes is not the maximum number of strokes (NO in step S214), the processing proceeds to step S215.

In step S215, the identification unit 122 starts an input waiting timer. The input waiting timer is processing for measuring an elapsed time from when the input position is released (when the obtainment unit 121 receives the "RELEASE" event immediately before) to reach a predetermined time length. The processing of the input waiting timer is executed in order to consider a possibility that a user intends to draw a hand-drawn figure constituted of two or more strokes. In other words, while there is a possibility that a subsequent stroke is drawn after a first stroke is drawn, determination of whether a command by a hand-drawn figure is input is suspended. The predetermined time length measured by the timer is a time length for waiting input of a next input position after the input position is released. The predetermined time length is set to an appropriate value in advance by considering that a user can continuously input a next touch point after releasing a touch point and a waiting time for next processing after the release. For example, the predetermined time length is set to one second.

In step S216, the obtainment unit 121 determines whether information of a new input position is notified from the touch sensor. More specifically, the obtainment unit 121 determines whether the coordinate information of a new input position is obtained together with the "TOUCH" event. If it is determined that the information of the new input position is notified from the touch sensor (YES in step S216), in step S218, the identification unit 122 stops the input waiting timer, and the processing returns to step S201 to continue the subsequent processing. Whereas if it is determined that the information of the new input position is not notified from the touch sensor (NO in step S216), the processing proceeds to step S217.

In step S217, it is determined whether the input waiting timer has expired. In other words, it is determined whether a time during which a subsequent stroke is possibly drawn after the release has elapsed. If it is determined that the input waiting timer has expired (YES in step S217), the processing proceeds to step S212. In this case, it can be considered that a next stroke is less likely to be input, and it is regarded that input of the hand-drawn figure is cancelled, so that the restraint of the scroll display is released in step S212. Whereas if it is determined that the input waiting timer has not expired (NO in step S217), the processing returns to step S216.

In this regard, during when a long touch is not detected in step S202, and the input position is not released by the determination in step S205, in step S219, the display control unit 126 executes the scroll display corresponding to a change in the coordinates of the input position. According to the present exemplary embodiment, when a change amount of the coordinates of the input position is larger than a predetermined distance, the scroll control unit 125 regards that the input position is moved and notifies the display control unit 126 of a movement amount for slidingly moving the display image according to the movement amount. The predetermined distance is, for example, set to d3 [dot].

In step S219, the display control unit 126 generates drawing data of the image displayed in a state in which the image is moved and outputs the drawing data to the touch panel display 115. Then, the processing is terminated. However, the display control unit 126 does not receive an instruction of an image movement amount during when the scroll control unit 125 restrains the scroll display, so that the display control unit 126 terminates the processing without outputting the drawing data to the touch panel display 115. As described above, when the scroll display is in a restraint state in step S203, if the input position is moved, the movement is not valid as a scroll operation, and the image is not moved in the display screen. When the scroll display is restrained and the input position is moved without released, the processing in steps S201, S205, and S219 is repeated, and the information pieces regarding the obtained input positions are stored in the RAM 114. Further, in response to release of the input position, the processing proceeds from step S205 to step S206, and the shape recognition processing is executed based on the loci of the input positions stored in the RAM 114.

An example of the processing for recognizing movement of the touched input position by distinguishing movement intended to a scroll operation from movement intended to a gesture operation according to the first exemplary embodiment has been described above. According to the present exemplary embodiment, the scroll display is restrained in response to detection of a long touch based on the information of the obtained input position, and a series of input positions input thereafter is identified as a target of the recognition processing of a hand-drawn figure which is input with the intention of a gesture operation.

Operation Example of First Exemplary Embodiment

Figure 5A:
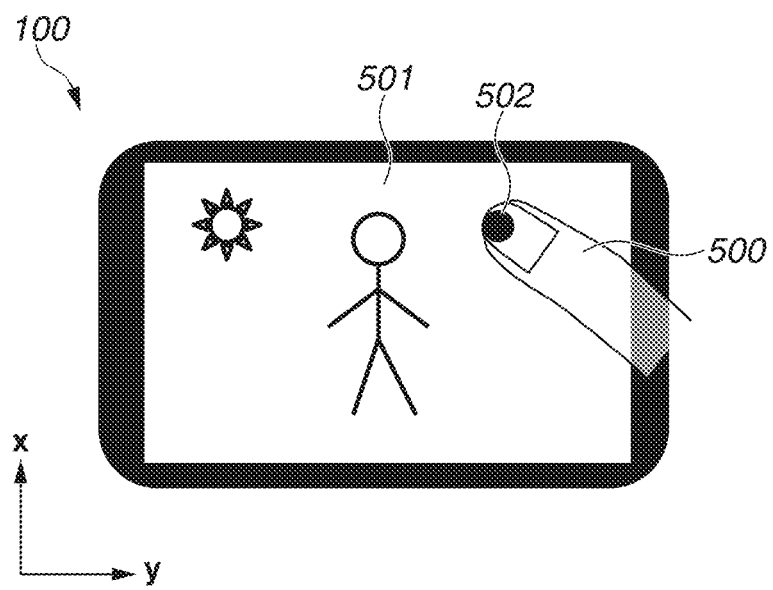
FIGS. 5A and 5B illustrate examples of scroll operations.
Figure 5B:
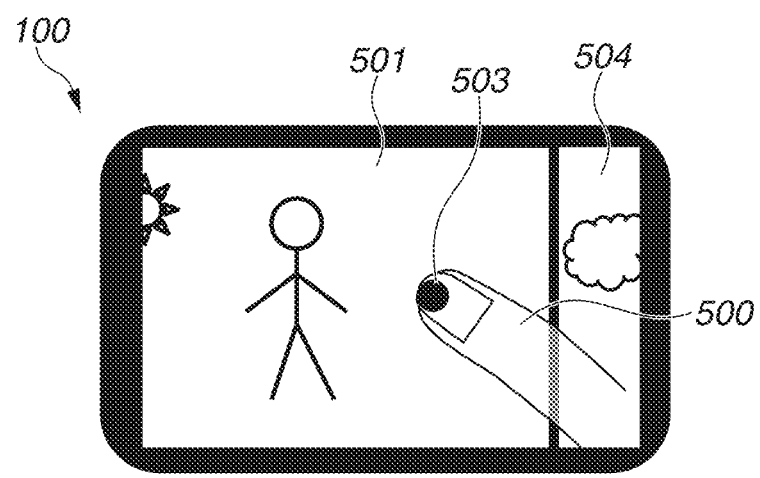

An operation example when a user inputs a scroll operation to the information processing apparatus 100 according to the first exemplary embodiment is described with reference to FIGS. 5A and 5B. FIG. 5A illustrates a state in which an image 501 is displayed on the display screen of the information processing apparatus 100. When a user starts a touch with a finger 500, an input position 502 is obtained. Next, FIG. 5B illustrates a state in which the finger 500 is moved to lower left (a direction to which both of the X coordinate and the Y coordinate are reduced), and an input position 503 is detected. However, a long touch is not performed during when the state is shifted from that in FIG. 5A to that in FIG. 5B (NO in step S202). Since the finger 500 is not released (NO in step S203), the information processing apparatus 100 regards that the same input position is moved from coordinates of the input position 502 to coordinates of the input position 503 based on the obtained ID. According to the present exemplary embodiment, when a long touch is not input immediately after the start of the touch, the movement of the input position is reflected to the scroll display (in step S219). Therefore, in FIG. 5B, the image 501 is scrolled to a left direction by following the movement of the input position, and an image 504 newly appears from a right side.

In FIG. 5B, an example is illustrated in which a scroll direction of the image 501 is limited to the Y-axis direction if the input position is also moved in the X-axis direction. However, two-dimensional scroll display may be performed by following the movement of the input position.

Figure 6A:
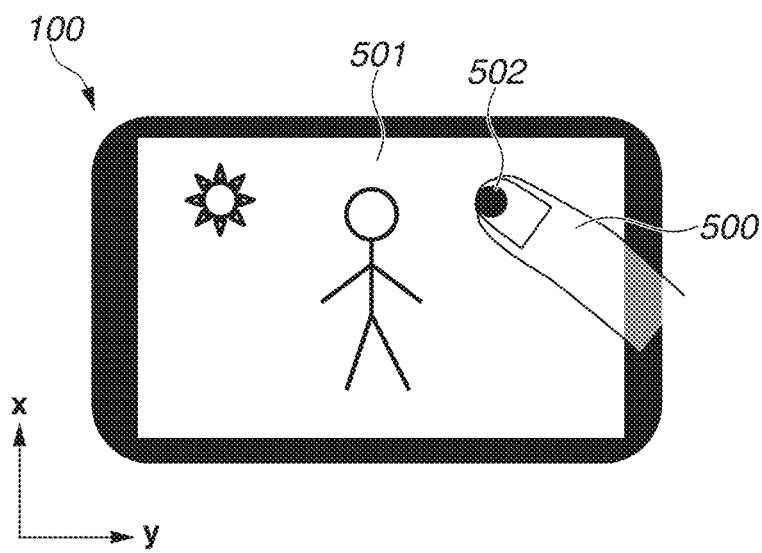
FIGS. 6A to 6C illustrate examples of gesture operations.
Figure 6B:
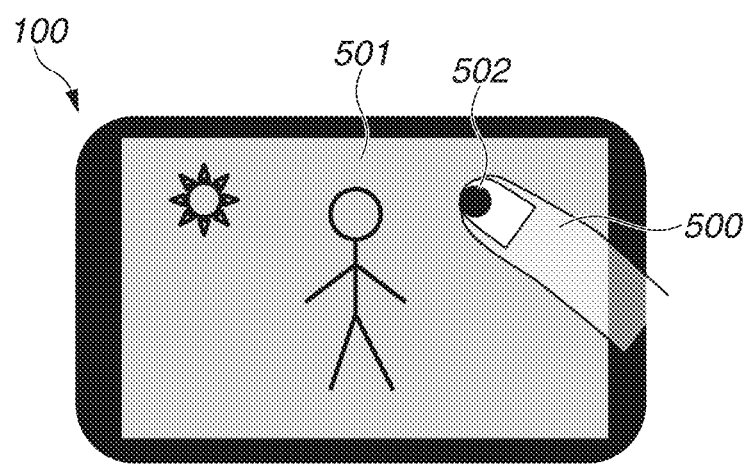

Next, an operation example when a user inputs a gesture operation by drawing a hand-drawn figure to the information processing apparatus 100 according to the first exemplary embodiment is described with reference to FIGS. 6A to 6C and FIGS. 7A to 7F. FIG. 6A illustrates the same state in FIG. 5A, therefore, the common elements are denoted by the same reference numerals. FIG. 5B illustrates a change in the information processing apparatus 100 when the finger 500 performs a long touch on the input position 502 (YES in step S202). In FIG. 6B, the scroll display of the screen by the movement of the input position is restrained in response to that the information processing apparatus 100 recognizes a long touch (in step S203), and the gray area is displayed on the display screen (in step S204). A user visually recognizes that the screen turned gray, and thus it is easier for the user to recognize that a hand-drawn figure can be input. In this regard, by adjusting transparency of the gray area, a user can sufficiently recognize the image as the target of the gesture operation. On this occasion, the information processing apparatus 100 stores the drawing data of the display screen displayed before the gray area is displayed and immediately performs processing for restoring the former display state when the gesture input is canceled.

Figure 6C:
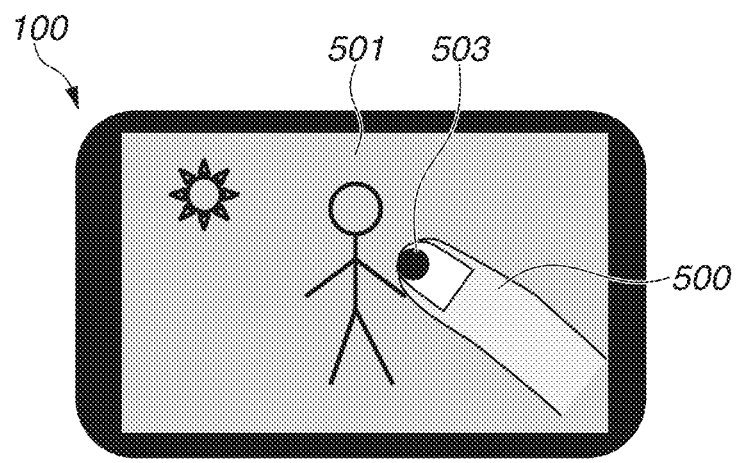

FIG. 6C illustrates a state in which the user's finger 500 is moved, and the input position 503 is obtained. It is assumed that the coordinates of the input position 503 is the same as those in FIG. 5B. However, in FIG. 5B, the image 501 is subjected to the scroll display by following the movement of the input position, whereas in FIG. 6C, the image 501 is not moved since the scroll is restrained. Processing for displaying a line indicating a locus of the moved input positions may be added here. In such a case, a user can input a gesture operation while understanding a shape of the locus recognized by the information processing apparatus 100.

Figure 7A:
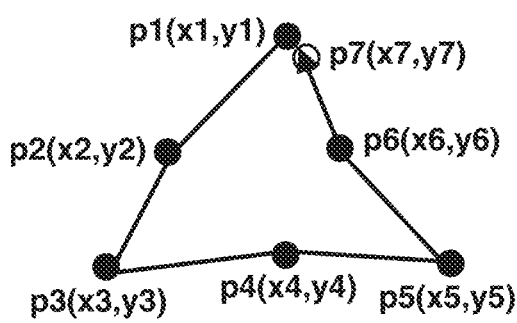
FIGS. 7A to 7F illustrate examples of hand-drawn figures recognized by gesture operations.
Figure 7D:
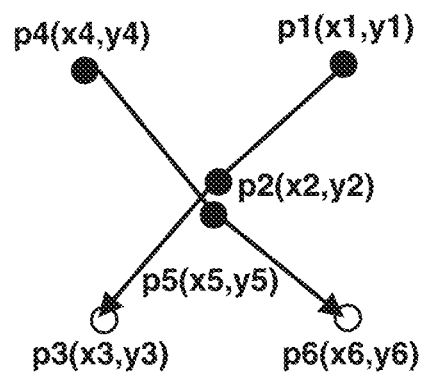

Specific examples of the shape recognition processing of a locus executed in step S206 after a user draws a hand-drawn figure in a touched state and separates (releases) the finger therefrom are described with reference to FIGS. 7A to 7F. FIGS. 7A and 7D each illustrate a locus of a series of input positions obtained by the information processing apparatus 100 after a long touch. A movement locus of the input positions is indicated which is obtained after the long touch by excluding the input positions obtained during the long touch after the start of touch. FIG. 7A corresponds to a case when a hand-drawn figure with a triangular mark shape is input, and FIG. 7D corresponds to a case when a hand-drawn figure with a cross mark shape is input. A white circle in each drawing represents an input position at which release is detected and an input position last obtained in one stroke.

Figure 7B:
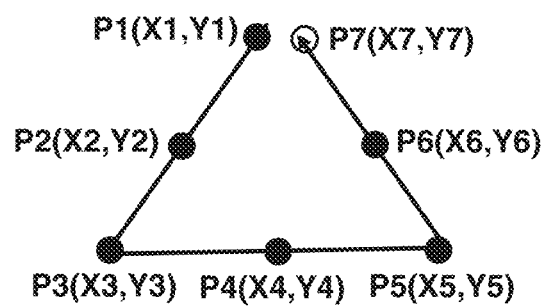

FIG. 7A illustrates a state in which a user inputs a hand-drawn figure of a triangular mark. A series of obtained input positions includes seven points namely positions p1 to p7. The position p1 is an input position obtained after the long touch by excluding the input positions obtained during the long touch after the start of touch, and information of the input position is added in the input order and constitutes the locus. Depending on a detection period of an input position and a size of the display, input positions more than seven points may be obtained and the locus may be drawn by these points. Even in such a case, according to the present exemplary embodiment, the input position is identified at seven points after the release of the input position and the stroke is divided into seven parts. According to the present exemplary embodiment, a locus division number used in the recognition processing is coincident with the number of coordinate points constituting the shape of the stroke registered in the dictionary 124. In other words, in the dictionary 124 according to the present exemplary embodiment, a model constituted of seven coordinate points is registered as a shape of a hand-drawn figure corresponding to a command. FIGS. 7B and 7C each illustrate an example of a model registered in the dictionary 124 as shape information of a triangular mark, and FIGS. 7E and 7F each illustrate an example of a model registered in the dictionary 124 as shape information of a cross mark.

Figure 7E:
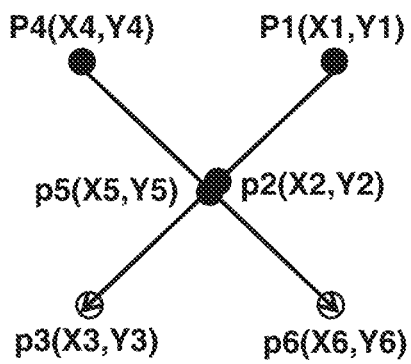
Figure 7C:
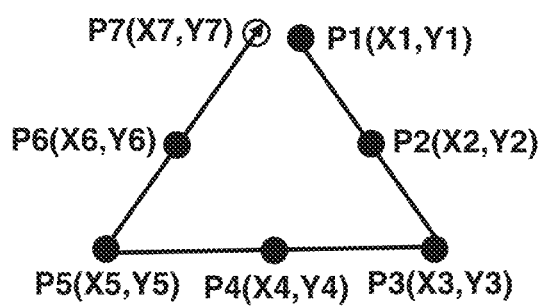
Figure 7F:
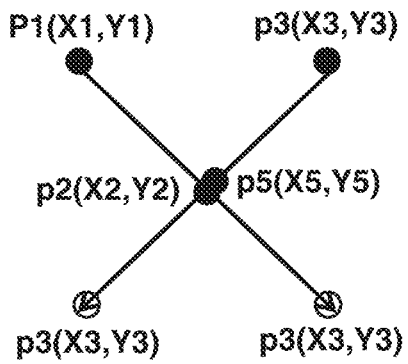

In step S206, the processing for recognizing the shape of the movement locus of the input positions is performed based on input as illustrated in FIGS. 7A and 7D and the dictionary 124 information as illustrated in FIGS. 7B, 7C, 7E, and 7F. More specifically, the movement locus of the input positions input by a user is compared with the shape of the model registered in advance, and the shape of the model coincide coincident with the movement locus is identified. Information of the locus registered in the dictionary 124 is constituted of a plurality of coordinates of which an input order is fixed. A triangular mark in FIGS. 7B and 7C is constituted of one stroke, and a cross mark in FIGS. 7E and 7F is constituted of two strokes. Even if a shape of a figure is the same, a plurality of models corresponding to different input orders is stored in the dictionary 124, and accordingly, if a user draws a stroke in a different stroke order, the figure can be recognized as the same shape. FIGS. 7B and 7C illustrate locus models of a triangular mark in a different stroke order, and FIGS. 7E and 7F illustrate locus models of a cross mark in a different stroke order. Regarding a calculation method for comparing a locus shape, first, a distance between points is calculated. The points coincide with each other in the input orders thereof among the coordinates of the input positions constituting the input hand-drawn figure and coordinates constituting figures registered in the dictionary 124. A distance is calculated at all points from a start point to a release point of input, and an integrated value of distances obtained as calculation results is used as a value indicating magnitude of difference in shapes between the input locus and the dictionary 124 information. For example, a distance between the position p1 in FIG. 7A and a position P1 in FIG. 7B is calculated, the similar distance calculation is executed to seven coordinates in turn, and a total sum of the calculation results is regarded as the magnitude of the difference between the shapes. Therefore, as an obtained value is smaller, the shapes are similar to each other. According to the present exemplary embodiment, when the integrated value is equal to or less than a predetermined threshold value, it is regarded that the shape of the hand-drawn figure input by a user coincides with the shape of the model of a calculation target. With respect to the input in FIG. 7A, the shape of the triangular mark in FIG. 7B is identified as a recognition result of the input hand-drawn figure. Further, in the dictionary 124, the hand-drawn figure of the triangular mark is corresponded to the command to instruct the screen transition to the list screen of a plurality of thumbnail images. Thus, after the recognition processing, the screen transition is executed (in step S213). In addition, the displayed gray area is deleted, and the restraint of the scroll display is released (in step S212).

FIG. 7D illustrates a state in which a user inputs two strokes constituting a cross mark as a hand-drawn figure. Input positions constituting a first stroke of the cross mark are the positions p1 to p3, and input positions constituting a second stroke are positions p4 to p6. The input position is once released at the position p3, and input is performed from the positions p4 to p6 and then released again. The recognition processing in step S206 is executed every time the release is detected. According to the present exemplary embodiment, a model coincident with a linear shape from the positions p1 to p3 is not registered in the dictionary 124. Therefore, when a release point at the position p3 is detected, there is no command corresponding to the input stroke (NO in step S207). In addition, the number of input strokes is not the maximum number of strokes "2" in the dictionary 124 (NO in step S214), and thus an elapsed time length after the release is determined in the timer processing. If the input position p4 is detected within one second (YES in step S216), the coordinates of the movement locus of the input positions are continuously stored, and the shape recognition processing is executed again at the time point when a release point at the position p6 is detected.

As a recognition result of the hand-drawn figure, the shape of the cross mark in FIG. 7E is identified. In the dictionary 124 according to the present exemplary embodiment, the cross mark is associated with the command to call the deletion function of the image of the operation target image displayed at that time point and information of the GUI screen to be displayed corresponding to the command. Thus, when the recognition processing is complete, display of the gray area is deleted, and the confirmation screen of whether to execute deletion of the image is displayed (in step S209). The processing corresponding to the user operation received on the confirmation screen is executed (in step S211), the restraint of the scroll display is released (in step S212), and display contents are changed according to the situation. For example, if execution of the deletion processing is instructed by an operation on the GUI screen, image data is deleted from the HDD, and a previous or next image of the deleted image is displayed. When cancel of the deletion processing is instructed, the display returns the former display state when the restraint of the scroll is released. As described above, when the processing difficult to be restored is executed, the confirmation screen is displayed, and accordingly, a serious mistake of the user operation can be prevented. For example, if a user incorrectly remembers a shape of a hand-drawn figure for the intended operation, an erroneous operation can be reduced.

<Modification>

Figure 2:
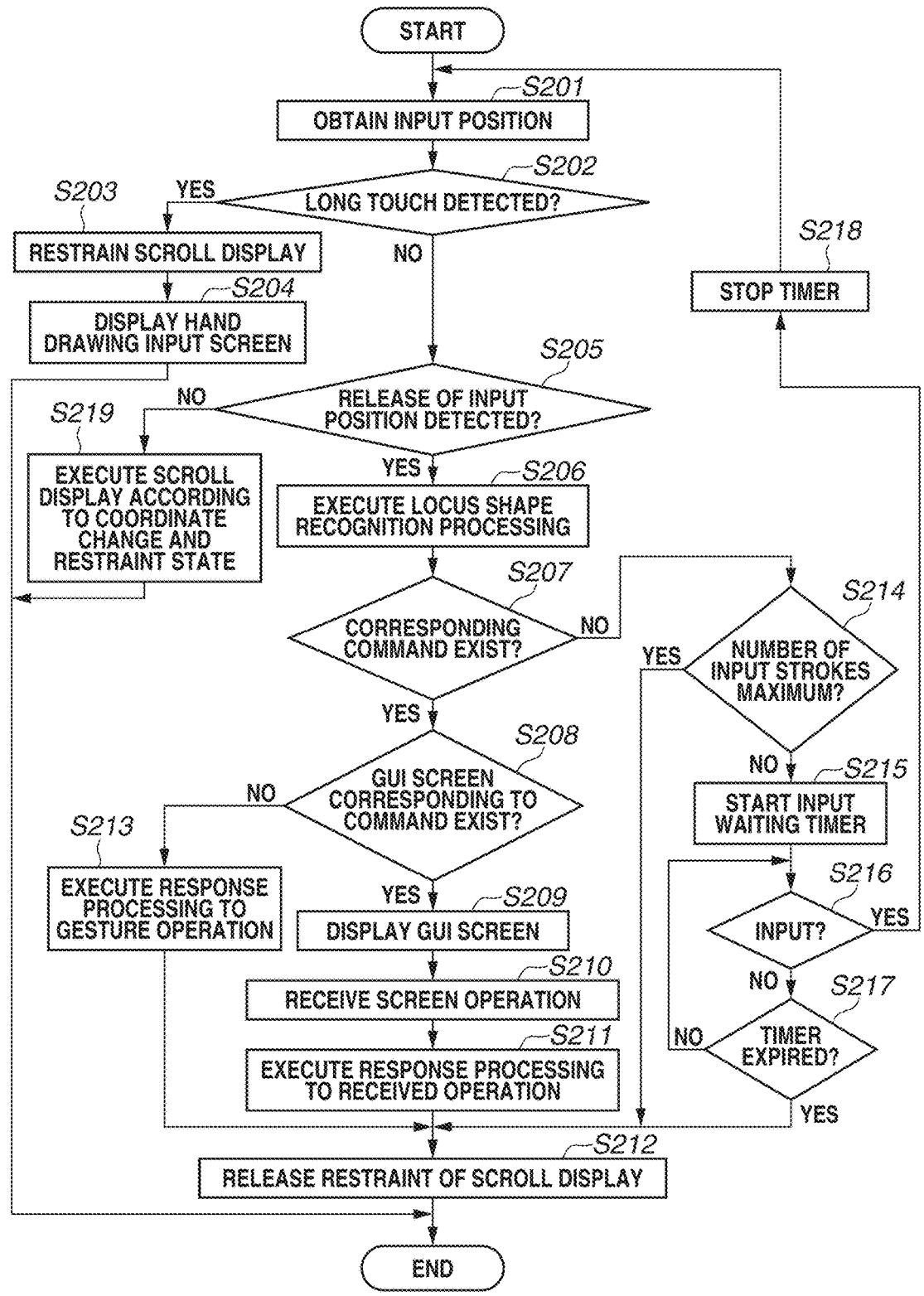
FIG. 2 is a flowchart illustrating an example of a processing flow for recognizing a touch operation.

In the above-described processing in the flowchart in FIG. 2, input of a long touch is described as an example of a first condition of restraining the scroll display, conditions determined here are not limited to a long touch. For example, a tap, continuous taps, and a multi-touch can be applied instead of a long touch. A tap operation is an operation recognized when a detected input position remains within a predetermined range and is no longer detected within a predetermined time period.

Figure 3B:
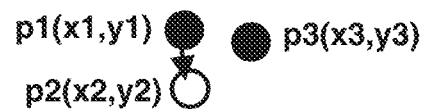

A continuous double tap operation is an operation in which a tap operation is continuously performed twice or more within a predetermined time period. A multi-touch operation is an operation in which two or more input positions are detected at the same time. A double tap in which a tap operation is input twice in a row is described as an example of the continuous tap operation with reference to FIG. 3B and FIG. 4B. FIG. 3B illustrates a series of input positions obtained during the double tap operation. A black circle represents a touched input position, and a white circle represents a release point at which the touch is released. FIG. 4B is a chart indicating timings when the input positions are obtained during the double tap operation. When the double tap operation is to be detected, threshold value processing is performed in a time length of (t3–t2). If it is determined that the tap operation is performed twice in a row in an interval short enough to be within a predetermined time length, it is determined that the double tap is performed at the time point when the position p3 is obtained. If the continuous tap is set as a condition of restraining the scroll display, the processing in step S202 in FIG. 2 may be changed to processing for detection the continuous tap.

Figure 3C:
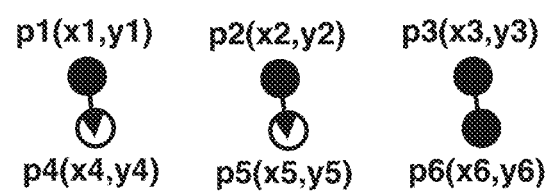

A multi-touch is an operation in which two or more input positions are detected at almost the same time. However, an operation of a multi-touch at two points is often assigned to an operation of enlargement and rotation of an image and the like, so that the operation can be distinguished when input of three or more points is set as a condition of shifting to the hand drawing input mode and restraining the scroll display. An example of a state in which a multi-touch input at three points is recognized is described with reference to FIG. 3C and FIG. 4C. FIG. 3C illustrates input positions of the multi-touch operation. A black circle represents an input position, and a white circle represents a release point. FIG. 4C is a timing chart corresponding to FIG. 3C. According to the present exemplary embodiment, the touch sensor notifies of information of the input position one point each even in the multi-touched state, so that it is recognized that the operation is the multi-touch operation at the time t3, and the restraint of the scroll display is executed. Subsequently, a locus to be recognized as a hand-drawn figure is a movement locus of coordinates of any one of a plurality of detected input positions or the center point or the center of gravity of the plurality of detected input positions. When any one of a plurality of detected input positions is followed to recognize the movement locus, the gray area is displayed in step S204, and a step for detecting that the number of the input positions is reduced to one is added after shifting to the hand drawing input mode. For example, if a multi-touch at three input positions as in FIG. 3C is a trigger to start the hand drawing input, release of two points are detected, and the coordinate information pieces of the released input positions are deleted from the loci stored in the RAM 114. Then, the coordinates of the remaining one point are stored, and a shape of the movement locus is recognized in response to detection of release.

As described above, according to the present exemplary embodiment, if information of at least one or more input positions obtained immediately after the start of the touch satisfies the first condition, the scroll display is restrained, and accordingly, an environment is provided in which input can be performed by easily switching a scroll operation and a gesture operation. The first condition is a condition defined by information other than the coordinates of the input positions (for example, a duration time, the number of continuation, and the number of inputs). Which condition is used may be selected according to a touch operation can be received by the information processing apparatus 100. For example, if an individual command is assigned to a long touch, a different condition such as a tap is selected, and thus an environment can be provided in which input can be performed by easily switching a scroll operation and a gesture operation.

Further, in the above-described step S202, it is determined whether a long touch is input immediately after the start of the touch. However, it may be modified to determine whether a long touch is input without limiting the timing at immediately after the touch. In other words, the scroll display may be restrained by detecting a long touch performed after the input position is moved for a predetermined distance or more. However, in this case, the coordinate information of the input position from immediately after the start of the touch to when the long touch is performed is cleared and excluded from a target of the recognition processing of a gesture operation performed thereafter. In other words, recognition of the shape of the movement locus as the gesture operation is limited to the movement locus following after the long touch. Further, regarding a long touch performed after the input position is moved for a predetermined distance or more, a condition of a duration time length may be changed from that of a long touch immediately after the start of the touch. More specifically, the fact that the input position remains within a predetermined range for a longer time is set as a condition of determining whether the long touch is input. As described above, the condition of the duration time of the long touch is set longer, and operation efficiency of a long touch can be improved while reducing interference of the operation with a screen scroll operation.

According to the above-described exemplary embodiment, the gray area is displayed when the scroll display is restrained in order to indicate that input of a hand-drawn figure can be received, however, the exemplary embodiment is not limited to this configuration. An area with color other than gray may be used, and shades and brightness of the display screen may be changed without limiting color. In addition, it can be indicated for a user that a hand-drawn figure can be input by hiding the display item, such as a button, and displaying guidance for inputtable gesture shapes.

According to the first exemplary embodiment, the information processing apparatus is shifted to a state of receiving input of a hand-drawn figure in response to detection of a long touch and then recognizes a shape of a locus of input positions obtained after the long touch in response to detection of release of the input position. In other words, it is based on the premise that a user starts input of a hand-drawn figure without releasing the input position after the long touch. Therefore, a start point of a movement locus of which a shape is recognized always coincides with a position at which a long touch is input. In contrast, according to a second exemplary embodiment, an example in which processing is added is described. The processing to be added is to limit a stroke of which a shape is recognized using a second condition from one or more strokes of input positions obtained after the scroll display is restrained in response to a long touch and input of a hand-drawn figure becomes available. The second condition is a condition different from the first condition and defined with respect to a state of a locus of input positions already input. Specifically, according to the present exemplary embodiment, a length of a first stroke is focused so as to determine whether the first stroke is a stroke to be a target of the shape recognition. Accordingly, if a user once takes his/her hand off the display screen at the time point when a long touch is recognized by the information processing apparatus 100 and again starts to input a stroke, recognition of a hand-drawn figure can be performed according to an intention of the user.

The external appearance and the configurations of the information processing apparatus 100 according to the present exemplary embodiment are the same as those in the first exemplary embodiment described with reference to FIGS. 1A to 1C, and thus the detailed descriptions thereof are omitted. However, the identification unit 122 according to the second exemplary embodiment executes the recognition processing after determining whether the first stroke among the strokes constituted of the input positions obtained after the long touch is the target of the shape recognition processing. More specifically, if the first stroke is too short as a stroke constituting a part of the hand-drawn figure, the input positions constituting the relevant stroke are not regarded as input position candidates constituting the hand-drawn figure and excluded from the target of the shape recognition processing. The dictionary 124 according to the second exemplary embodiment also stores at least strokes with shapes of a triangular mark, a cross mark, and a circle mark exemplified in the first exemplary embodiment.

According to the present exemplary embodiment, processing for recognizing a touch operation is executed in accordance with a flowchart in FIG. 8. Steps in common with those in the flowchart in FIG. 2 described in the first exemplary embodiment are denoted by the same reference numerals, and the detailed descriptions thereof are omitted. A point different from the flowchart in FIG. 2 is that in step S205, if release of the input position is detected (YES in step S205), the processing proceeds to step S801, and the recognition processing of the gesture operation is executed.

Figure 9A:
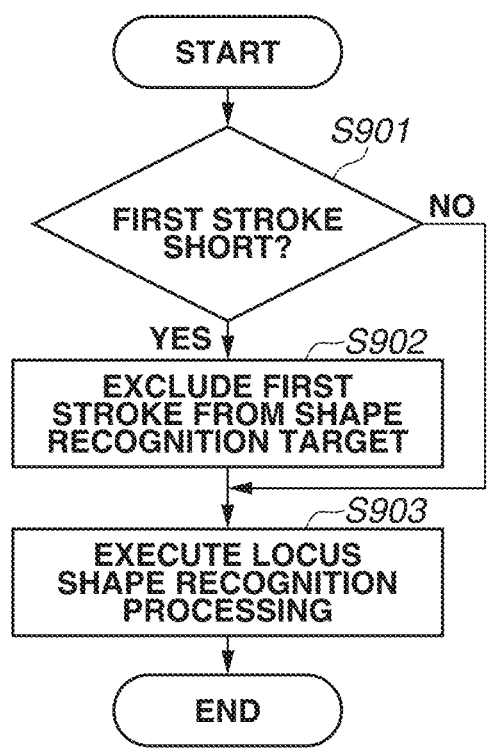
FIGS. 9A and 9B are flowcharts illustrating examples of processing flows for recognizing shapes of loci.

FIG. 9A is a flowchart illustrating details of the recognition processing of the gesture operation executed in step S801 according to the second exemplary embodiment. In step S901, the identification unit 122 determines whether a length of a first stroke in the loci of the input positions input after the long touch is shorter than a predetermined length. The predetermined length here is a threshold value of a length set according to a shortest stroke in the strokes stored as the hand-drawn figures in the dictionary 124. If it is determined that the first stroke is shorter than the predetermined length (YES in step S901), the processing proceeds to step S902. Whereas if it is determined that the first stroke is not shorter than the predetermined length (NO in step S901), the processing proceeds to step S903. In step S902, the first stroke shorter than the length set as the threshold value is considered not to be input to constitute the stroke of the hand-drawn figure and excluded from a recognition target of a locus shape. For example, the information thereof is deleted from the RAM 114. Alternatively, the information thereof is stored in association with attribute information indicating not the recognition target. In step S903, the identification unit 122 executes the recognition processing of the locus shape for the information pieces of the input positions remaining without being excluded in step S902 as targets among the information pieces of the input positions stored in the RAM 114. The recognition processing is the same as the processing described in the first exemplary embodiment (step S206 in the flowchart in FIG. 2), and thus the detailed descriptions thereof are omitted. When the recognition processing is complete, the processing returns to the flowchart in FIG. 8 and proceeds to step S207.

Operation Example of Second Exemplary Embodiment

An operation example when a user inputs a gesture operation to the information processing apparatus 100 according to the second exemplary embodiment is described with reference to FIGS. 11A and 11B and FIGS. 12A and 12B. The operation example is described by comparing a case when a user inputs a hand-drawn figure of a triangular mark without releasing the touch after the long touch with a case when a user once releases the touch after the long touch and again inputs a hand-drawn figure of a triangular mark.

Figure 11A:
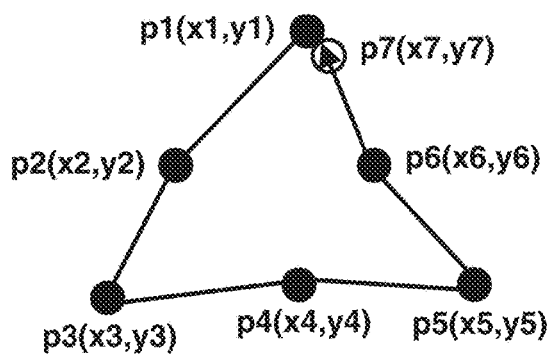
FIGS. 11A to 11E illustrate examples of loci constituted of input positions obtained by operation examples.

The case when a user inputs the hand-drawn figure of the triangular mark without releasing the touch after the long touch is described as an operation example A. FIG. 11A illustrates a series of input positions p1 to p7 obtained when the hand-drawn figure of the triangular mark is input without releasing the touch after the long touch. FIG. 12A is a timing chart corresponding to FIG. 11A and illustrates a timing when each of the input positions p1 to p7 is obtained. First, regarding the positions p1 to p6, when the information pieces regarding the input positions are obtained (in step S201), the long touch is already input and not detected this time (NO in step S202), and the touch is not released (NO in step S205), and thus the operation is terminated without executing the deactivated scroll display. This processing is repeated. When the information of the position p7 is obtained at the time point t7, the release is detected (YES in step S205), and the recognition processing in step S801 is executed. In the case of the operation example A, the first stroke constituted of the positions p1 to p7 is long enough (NO in step S901), therefore the shape recognition processing using the dictionary 124 is executed (in step S903) and the stroke of the triangular mark is identified. Subsequent processing is similar to that in the first exemplary embodiment, and the command corresponded to the stroke of the triangular mark shape (transition to the list screen of a plurality of thumbnail images) is executed.

Figure 11C:
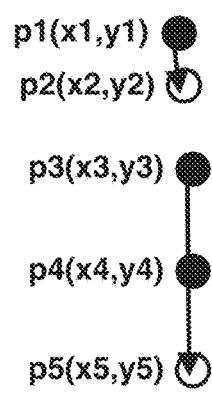
Figure 11B:
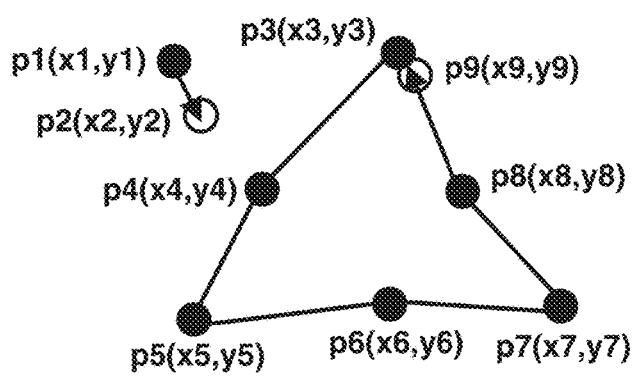

Next, the case when a user once releases the touch after the long touch and again inputs the hand-drawn figure of the triangular mark is described as an operation example B. FIG. 11B illustrates a series of input positions p1 to p9 obtained when the touch is once released and then the hand-drawn figure of the triangular mark is input. FIG. 12B is a timing chart corresponding to FIG. 11B and illustrates a timing when each of the input positions p1 to p9 is obtained. In the operation example B, the first stroke is constituted of the positions p1 and p2, and the second stroke is constituted of the positions p3 to p9. In this case, the first stroke is not intended to draw the hand-drawn figure and very short. Hereinbelow, detailed descriptions of the processing overlapping with the above-described operation example are omitted.

In the operation example B, in the first stroke, when release information of the position p2 is obtained at the time p2 (YES in step S205), the recognition processing in step S801 is executed. A length between the positions p1 and p2 is shorter than the threshold value (YES in step S901). Thus, the positions p1 and p2 are excluded from the target of the shape recognition (in step S902), and at this time point, a locus to be the target of the recognition processing is not stored. Therefore, as a result of the recognition processing (in step S903), there is no stroke to be identified (NO in step S207). The number of strokes at this time point is "1", and it is not the maximum number of strokes (NO in step S214). The position p3 is obtained before the input waiting timer has expired, and the timer is stopped (in step S218), then the processing is started with respect to the position p3. During when the positions p3 to p8 are obtained, the shape of the stroke is not identified, and the information pieces of the input positions are stored while restraining the scroll display. Then, if release of the position p9 is detected at the time t9 (YES in step S205), the recognition processing in step S801 is executed. A length between the positions p3 to p9 is longer than the threshold value (NO in step S901), the shape recognition processing is executed (in step S903), and the stroke of the triangular mark is identified. Subsequently, the command corresponded to the triangular mark (transition to the list screen of a plurality of thumbnail images) is executed.

As described above, according to the second exemplary embodiment, the recognition processing targeting on an appropriate input position can be executed in both of a case when a user starts input of a stroke without releasing the touch and a case when a user once releases the touch and starts the input after input of the hand-drawn figure becomes available. According to the present exemplary embodiment, the scroll display is restrained and the gray area is displayed simultaneously at the time point when the long touch is obtained, and accordingly, it is clearly indicated to a user that the hand drawing input becomes available. A user may unconsciously take his/her hand off when contents of the screen are largely changed. According to the second exemplary embodiment, in such a case, the user can naturally continue the operation without the need for performing the long touch again.

As described above, according to the second exemplary embodiment, the recognition processing can be performed by identifying the stroke intended to the hand-drawn figure by a user in a plurality of input strokes, so that more variety of hand-drawn figures can be recognized. It is noted that the modification similar to that of the first exemplary embodiment can be applied to the second exemplary embodiment.

According to the second exemplary embodiment, when a stroke of which a shape is recognized is selected from one or more strokes of the input positions obtained after the long touch, the fact that the first stroke is short is used as the second condition to exclude the stroke from the target of the shape recognition. In contrast, according to a third exemplary embodiment, propriety of exclusion is determined by the second condition considering a possibility that a shape including a short first stroke is registered in the dictionary 124, and accordingly, hand-drawn figures with far more variety of shapes can be recognized.

The external appearance and the configurations of the information processing apparatus 100 according to the present exemplary embodiment are the same as those in the first and the second exemplary embodiments described with reference to FIGS. 1A to 1C, and thus the detailed descriptions thereof are omitted. However, the identification unit 122 according to the third exemplary embodiment once treats the first stroke among the strokes constituted of the input positions obtained after the long touch as a target of the shape recognition processing. Then, the recognition unit 123 once executes the recognition processing and finally determines a stroke as the target of the shape recognition processing based on a result of the recognition processing and a length of the stroke. More specifically, if the first stroke does not coincide with any shape of the first stroke stored in the dictionary 124 and is too short as a stroke constituting a part of the hand-drawn figure, the recognition unit 123 regards that the input positions constituting the relevant stroke are not candidates constituting the hand-drawn figure. Therefore, the information pieces of the relevant input positions are excluded from the target of the shape recognition processing. In the dictionary 124 according to the third exemplary embodiment, strokes of character shapes, such as numbers, alphabets, and Japanese hiragana and katakana are registered in addition to strokes with shapes of a triangular mark, a cross mark, and a circle mark exemplified in the first and the second exemplary embodiments. The stroke of a character is corresponded to a command to input a text of the relevant character. However, the dictionary 124 according to the third exemplary embodiment manages shape information of each stroke of each hand-drawn figure corresponding to the command in order to enable the shape recognition processing to be performed on each stroke. The present exemplary embodiment can be effectively utilized especially in the case where registered character includes a relatively short first stroke, such as "j" or "i".

According to the present exemplary embodiment, processing for recognizing a touch operation is executed in accordance with the flowchart in FIG. 8 similar to the second exemplary embodiment. However, unlike in the second exemplary embodiment, in step S801, the recognition processing of the gesture operation is executed in accordance with a flowchart in FIG. 9B.

Figure 9B:
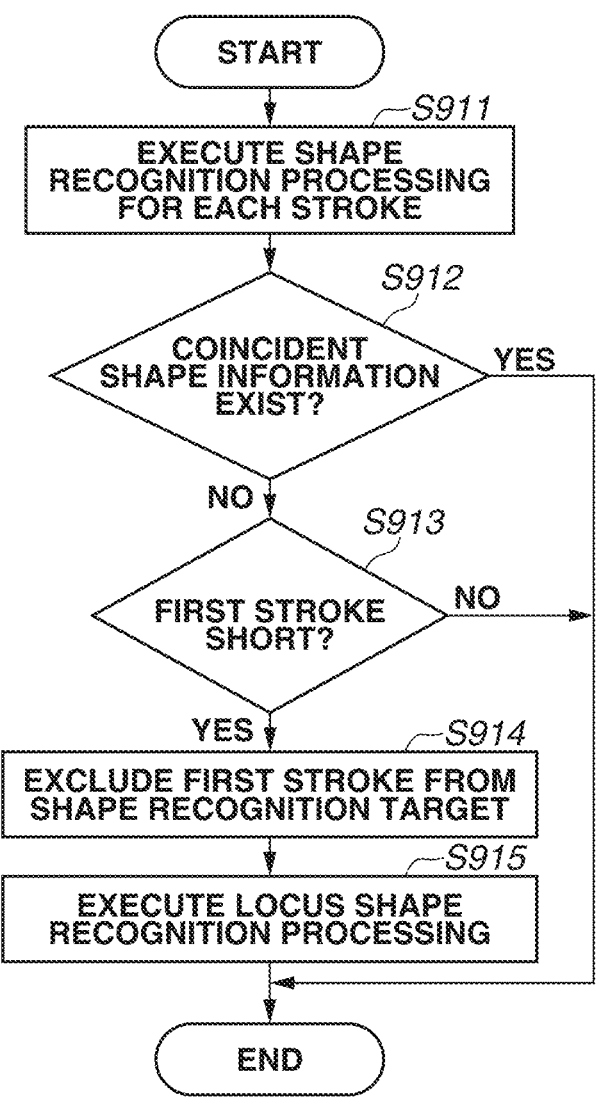

In the processing in the flowchart in FIG. 9B, first, in step S911, the recognition unit 123 executes the shape recognition processing for each input stroke based on the information regarding the input position stored in the dictionary 124. As described in the first exemplary embodiment, the shape recognition processing is executed by calculating the magnitude of difference between the input stroke and the model in the dictionary 124 from coordinates. In step S912, the recognition unit 123 determines whether there is the dictionary 124 data coincident with the input stroke as a result of the recognition processing executed in step S911. More specifically, the recognition unit 123 determines whether the dictionary 124 includes one dictionary 124 data (for example, data indicating a figure or a character) registered in the dictionary 124, wherein a shape of each stroke of the dictionary 124 data coincides with each shape of the input stroke. If the relevant dictionary 124 data is present (YES in step S912), the processing in the flowchart in FIG. 9B is terminated. Whereas if the relevant the dictionary 124 is not present (NO in step S912), the processing proceeds to step S913.

In step S913, the identification unit 122 determines whether a length of the locus of the first stroke among the loci of input positions input after the long touch is shorter than the predetermined length. This processing is the same processing in step S901 according to the second exemplary embodiment. If it is determined that the first stroke is shorter than the predetermined length (YES in step S913), the processing proceeds to step S914. Whereas if it is determined that the first stroke is not shorter than the predetermined length (NO in step S913), the processing proceeds to step S207 in the flowchart in FIG. 8. In step S914, the identification unit 122 excludes the first stroke from the recognition target of the locus shape. More specifically, the information of the input position of the excluded portion is deleted from the RAM 114, or the attribute information indicating that the input position is excluded is added thereto. In step S915, the recognition unit 123 executes the recognition processing of the locus shape for the information pieces of the input positions remaining without being excluded in step S914 as targets among the information pieces of the input positions stored in the RAM 114. The recognition processing is the same as the processing described according to the first exemplary embodiment. When the recognition processing is complete, the processing returns to the flowchart in FIG. 8 and proceeds to step S207. The subsequent processing is the same as those according to the first and the second exemplary embodiments.

Operation Example of Third Exemplary Embodiment

An operation example when a user inputs a gesture operation to the information processing apparatus 100 according to the third exemplary embodiment is described with reference to FIGS. 11C and 11D and FIGS. 12C and 12D. The operation example is described by comparing a case when a user inputs a locus of an alphabet "i" without releasing the touch after the long touch with a case when a user once releases the touch after the long touch and again inputs a locus of an alphabet "i". The dictionary 124 of the information processing apparatus 100 stores shape information of "i".

The case when a user inputs a locus of "i" without releasing the touch after the long touch is described as an operation example C. FIG. 11C illustrates a series of input positions p1 to p5 obtained when the locus of "i" is input without releasing the touch after the long touch. FIG. 12C is a timing chart corresponding to FIG. 11C and illustrates a timing when each of the input positions p1 to p5 is obtained. In the operation example C, the first stroke is constituted of the positions p1 and p2, and the second stroke is constituted of the positions p3 to p5. In this regard, the first stroke is intended to draw a hand-drawn figure and represents a dot of "i", and a stroke length thereof is shorter than the threshold value. Hereinbelow, detailed descriptions of the processing overlapping with the above-described operation example are omitted.

In the operation example C, when release of the position p2 is detected at the time t2 in the first stroke (YES in step S205), the recognition processing in step S801 is executed. In this stage, it is determined whether the first stroke of each shape information stored in the dictionary 124 coincides with a shape of the first stroke constituted of the positions p1 and p2. Here, at least the shape of the first stroke of "i" coincides with the stored shape information (YES in step S912), the first stroke is not excluded, and the processing proceeds to step S207. In this stage, only the first stroke of "i" coincides with the shape information, and it is not yet specified that corresponding to the hand-drawn figure is input, therefore it is determined that there is no command corresponding to the input stroke (NO in step S207). Further, the number of strokes is not the maximum number of strokes "2" (NO in step S214), so that the series of processing is again started in response to obtaining the input position p3 before the input wait timer has expired.

Regarding the second stroke, when release of the position p5 is detected at the time t5 (YES in step S205), the recognition processing in step S801 is executed. The shape recognition processing is executed to each of the first and the second strokes (in step S911), and the strokes of "i" is identified which coincide with both of the first and the second stroke (YES in step S912). In step S207, for example, a command to input an alphabet "i" is identified, and subsequently, the processing for, for example, displaying a type of "i" or shifting to a screen corresponding to the input of "i" is executed.

Figure 11D:
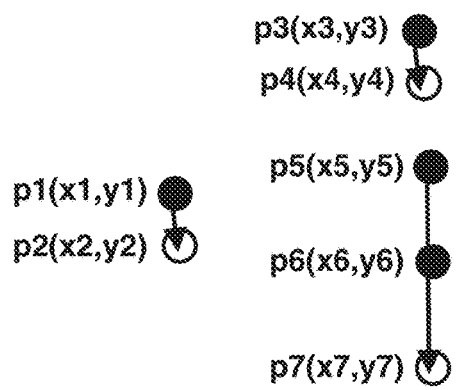

Next, the case when a user once releases the touch after the long touch and again inputs a locus of "i" is described as an operation example D. FIG. 11D illustrates a series of input positions p1 to p7 obtained when the touch is once released and then the locus of "i" is input. FIG. 12D is a timing chart corresponding to FIG. 11D and illustrates a timing when each of the input positions p1 to p7 is obtained. In the operation example D, the first stroke is constituted of the positions p1 and p2, the second stroke is constituted of the positions p3 and p4, and the third stroke is constituted of the positions p5 to p7. In this case, the first stroke is not intended to draw the hand-drawn figure and very short. The second and the third strokes are input with the intention to draw "i" by hand. Hereinbelow, detailed descriptions of the processing overlapping with the above-described operation example are omitted.

In the operation example D, the processing first executed for the first stroke is the same as that in the operation example C. The first stroke is short but coincides with at least the shape of the first stroke of "i" in the dictionary 124, therefore the processing is repeated after input of the position p3. Regarding the second stroke, the recognition processing in step S801 is executed in response to detecting release of the position p4 at the time t4. In the dictionary 124 according to the third exemplary embodiment, the dictionary 124 data of which first and second strokes are both short is not stored. Since there is no coincident dictionary 124 data (NO in step S912), and the first stroke is shorter than the threshold value (YES in step S913), in step S914, the first stroke is excluded from the target of the shape recognition processing. Accordingly, the stroke constituted of the input positions p3 and p4 which are not excluded among the input strokes newly becomes the target of the recognition processing as the first stroke of which a shape is recognized. In step S915, when the recognition processing is executed again, the stroke coincides with at least the shape of the first stroke of "i", however, the command is not identified at this time point (NO in step S207). The processing is again started in response to obtaining the input position p5 before the input wait timer has expired.

Regarding the last stroke, the recognition processing is executed when release of the position p7 is detected at the time t7. The stroke of "i" is identified by the recognition processing using the respective loci of the positions p3 and p4 and the positions p5 to p7 which are not excluded as the first and the second strokes (in step S911). In step S207, for example, a command to input an alphabet "i" is identified, and subsequently, the processing for, for example, displaying a type of "i" or shifting to a screen corresponding to the input of "i" is executed.

As described above, according to the third exemplary embodiment, the recognition processing can be executed even for a short stroke by determining whether a user intends to input a hand-drawn figure, so that more variety of hand-drawn figures can be recognized. It is noted that the modification similar to that of the first and the second exemplary embodiments can be applied to the third exemplary embodiment.

According to the second and the third exemplary embodiments, it is determined whether the entire first stroke is regarded as the target of the shape recognition processing so as to deal with a case when the hand drawing input screen is displayed, and a user once releases the touch and again starts input. According to a fourth exemplary embodiment, an example is described for identifying from which portion of a first stroke is input with the intention to draw a hand-drawn figure by the second condition considering a possibility that a user starts to draw a stroke by sliding an input position without releasing.

The external appearance and the configurations of the information processing apparatus 100 according to the present exemplary embodiment are the same as those in the other exemplary embodiments described with reference to FIGS. 1A to 1C, and thus the detailed descriptions thereof are omitted. However, when the input stroke does not coincide with the stroke registered in the dictionary 124, the identification unit 122 according to the fourth exemplary embodiment determines whether a portion of the first stroke is excluded from the target of the shape recognition based on a degree of bend of the first stroke. More specifically, if a portion which is extremely different from a successive locus in its angle and too short as an element constituting a hand-drawn figure is included at the beginning of the first stroke, the portion is considered not to be the input position candidate constituting the hand-drawn figure and excluded from the target of the shape recognition processing. In the dictionary 124 according to the fourth exemplary embodiment, at least strokes with shapes of a triangular mark, a cross mark, and a circle mark exemplified in the first and the second exemplary embodiments are registered.

Figure 10:
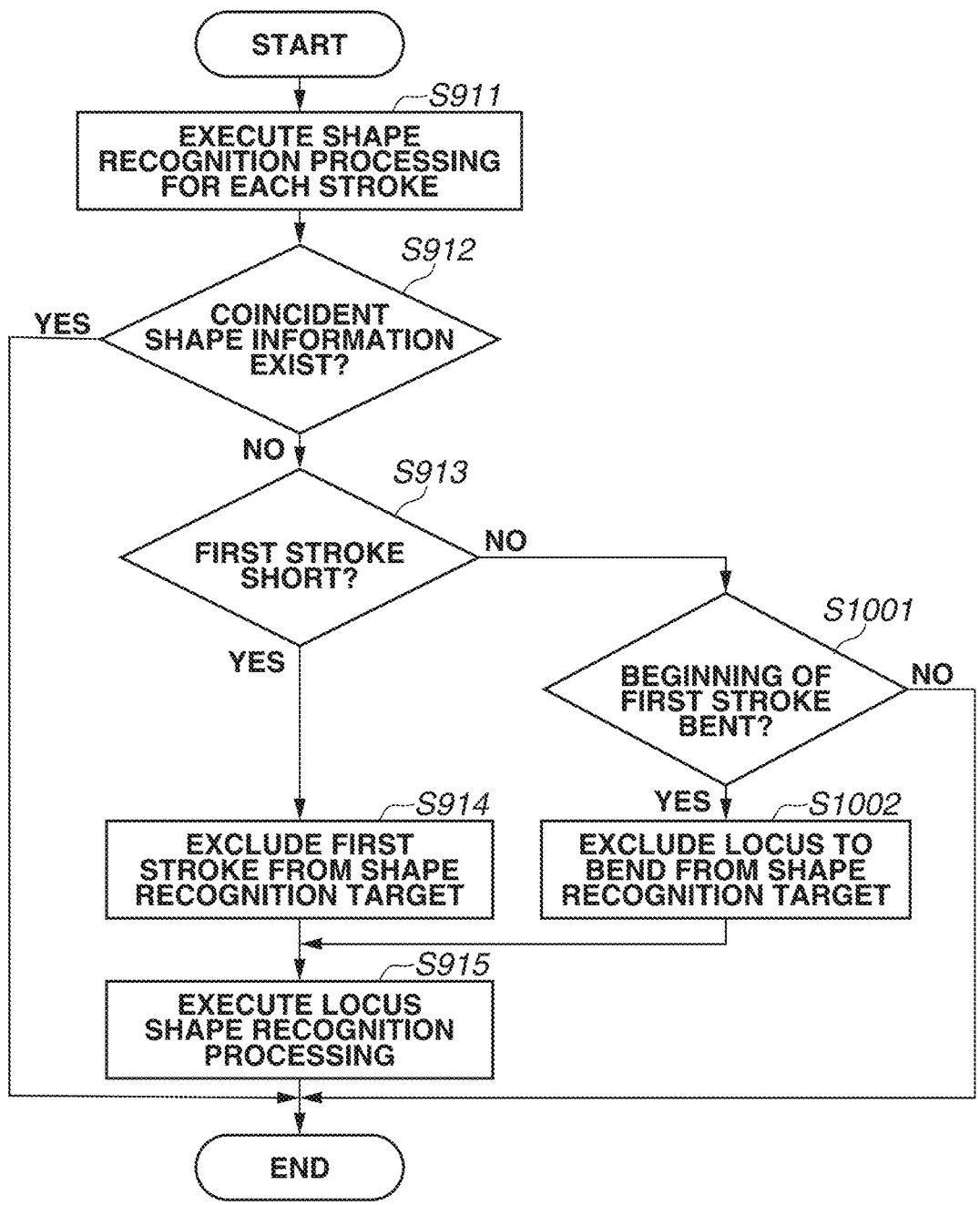
FIG. 10 is a flowchart illustrating an example of a processing flow for recognizing a shape of locus.

According to the present exemplary embodiment, processing for recognizing a touch operation is also executed in accordance with the flowchart in FIG. 8 similar to the second and the third exemplary embodiments. However, unlike in the second exemplary embodiment, in step S801, the recognition processing of the gesture operation is executed in accordance with a flowchart in FIG. 10. In the flowchart in FIG. 10, steps in common with those in FIG. 9B are denoted by the same reference numerals, and the detailed descriptions thereof are omitted.

According to the fourth exemplary embodiment, in step S913, if it is determined that a length of a locus of the first stroke is not shorter than the predetermined length (NO in step S913), the processing proceeds to step S1001. In step S1001, the recognition unit 123 determines whether the beginning of the first stroke is bent. For example, regarding a series of the input positions constituting a section of which an accumulated length from the start point is the predetermined length in the first stroke, an angle formed between a straight line connecting two successive input positions and the X axis is calculated. If a change amount of the angle is larger than a predetermined angle, it is determined that the beginning of the first stroke is bent. Subsequently, an input position of which an angle is largely changed before and after thereof is identified as a drawing start position. If it is determined that the beginning of the first stroke is bend (YES in step S1001), the processing proceeds to step S1002. If it is determined that the beginning of the first stroke is not bend (NO in step S1001), the processing returns to the flowchart in FIG. 8.

In step S1002, regarding the first stroke, a portion from the start point to the drawing start position is excluded from the target of the locus shape recognition processing. More specifically, the information of the input position of the excluded portion is deleted from the RAM 114, or the attribute information indicating that the input position is excluded is added thereto. Then, in step S915, the recognition processing is executed to the stroke constituted of the input positions remaining without being excluded, and the processing returns to the flowchart in FIG. 8. The subsequent processing is the same as those according to the above-described exemplary embodiments.

The order of the processing for determining a length of the entire first stroke in step S913 and the processing for determining a degree of bend of the first stroke may be switched. However, if a user wants to differentiate a position inputting the long touch from a position to start drawing of a hand-drawn figure, a load is smaller for the user to once release the touch, and the user is likely to do so unconsciously. Therefore, by executing first the processing for determining the length of the first stroke, a judgement of the situation can be performed more efficiently.

Further, according to the fourth exemplary embodiment, an example is described in which the processing for determining a degree of bend of the first stroke is executed in addition to the processing for determining the length of the entire first stroke according to the third exemplary embodiment, however, the processing for determining a degree of bend of the first stroke may be executed separately. At that time, the determination processing in step S1001 is again executed for the first stroke which is partially excluded, and the processing for excluding the beginning portion of the first stroke may be repeated based on an angle change. Accordingly, if movement of the input position is repeated before start of drawing of the hand-drawn figure, the drawing start position can be identified.

Operation Example of Fourth Exemplary Embodiment

Figure 11E:
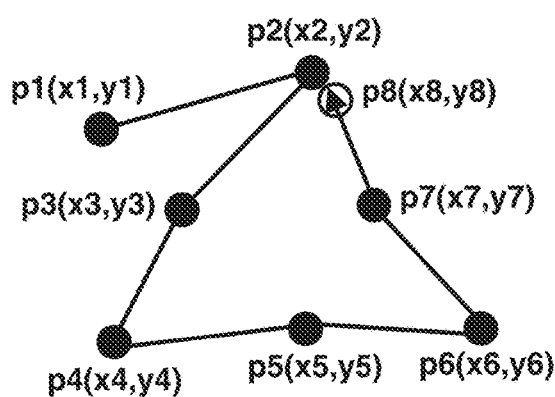

An operation example E when a user inputs a gesture operation to the information processing apparatus 100 according to the fourth exemplary embodiment is described with reference to FIG. 11E and FIG. 12E. FIG. 11E illustrates a series of input positions p1 to p8 obtained, for example, when a user performs a long touch at a position on a left side of the screen, moves the finger to a center portion without releasing the touch, and inputs a locus of a triangular mark. FIG. 12E is a timing chart corresponding to FIG. 11E and illustrates a timing when each of the input positions p1 to p8 is obtained. In the operation example E, the first stroke is constituted of all of the positions p1 to p8. However, a user performs the long touch at the position p1 and then moves the drawing start position of the hand-drawn figure to the position p2. Therefore, in the intention of the user, the positions p2 to p8 is a locus input as the input positions constituting the hand-drawn figure. Hereinbelow, detailed descriptions of the processing overlapping with the above-described operation example are omitted.

In the operation example E, when release of the position p8 is obtained at the time t8 (YES in step S205), input of the first stroke is complete, and the recognition processing in step S801 is executed. In this stage, it is determined whether the first stroke of each shape information stored in the dictionary 124 coincides with a shape of the stroke constituted of the input positions p1 to p8. However, the shape of the stroke does not coincide with the dictionary 124 data (NO in step S912), and the first stroke is longer than the length of the threshold value (NO in step S913). Therefore, in step S1001, it is determined whether the beginning of the stroke is bent. As an example, if a portion forming a sharp angle smaller than 90 [degree] is present in a part that total distance from the start point is not beyond threshold d4 [dot] of the first stroke, it is determined that the beginning of the stroke is bent. In the case of the example in FIG. 11E, a straight line passing through the positions p1 and p2 and a straight line passing through the positions p2 to p3 forms a sharp angle, and thus it is determined that the beginning of the stroke is bent (YES in step S1001). Accordingly, in step S1002, the portion before the position p2 is excluded from the shape recognition target. Then, in step S915, the shape recognition processing is executed, and the stroke of the triangular mark is identified. Subsequently, the command corresponded to the stroke of the triangular mark shape (transition to the list screen of a plurality of thumbnail images) is executed.

As described above, according to the fourth exemplary embodiment, the recognition processing is performed by identifying the drawing start position at which a user starts to input the hand-drawn figure even in one stroke, so that the information processing apparatus can deal with more variety of hand drawing input methods. It is noted that the modification similar to those of the other exemplary embodiments can be applied to the fourth exemplary embodiment.

According to the present disclosure, regarding movement of a position input to an arbitrary position in an input area, a portion to be a target of processing for recognizing a shape of a movement locus can be identified without reflecting the movement to scroll of a displayed screen.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-249425, filed Dec. 9, 2014, which is hereby incorporated by reference herein in its entirety.

What is claimed is:

1. An information processing apparatus comprising:
one or more processors which, when executing instructions, causes the information processing apparatus to function as:
an obtainment unit configured to obtain input positions input and periodically detected on an input area, and determine whether a first condition is satisfied by an initial portion of a series of the obtained input positions;
a display control unit configured to scroll at least a portion of an image displayed on a display screen in response to movement of an input position obtained by the obtainment unit;

a storage unit configured to store a plurality of dictionary data pieces corresponding to a plurality of instructions recognized by the information processing apparatus, wherein the plurality of dictionary data pieces includes figures constituted of two or more strokes; and a recognition unit configured to recognize an instruction corresponding to a figure based on a comparison between a shape of two or more strokes constituted of input positions input after the first condition is satisfied by the initial portion of the series of input positions obtained by the obtainment unit and shapes of the figures included in the plurality of dictionary data pieces, wherein the recognition unit determines whether a shape of a first stroke of the two or more strokes is similar to each of a first stroke of the figures included in the dictionary data pieces, and recognizes, in case of determination that the shape of the first stroke of the two or more strokes is similar to any one of the first stroke of the figures included in the dictionary data pieces, the instruction based on a comparison between a shape formed by all of the two or more strokes including the first stroke and the shapes of the figures included in the plurality of dictionary data pieces, wherein, the display control unit does not scroll the image in response to movement of an input position input after the first condition is satisfied, and wherein the recognition unit further determines, in case of determination that the shape of the first stroke of the two or more strokes is not similar to any one of the first stroke of the figures included in the dictionary data pieces, whether a second condition is satisfied by the first stroke of the two or more strokes constituted of input positions input after the first condition and, in case of determination that the second condition is satisfied, excludes the first stroke from a target of processing for determining whether the target forms one of the figures included in the plurality of dictionary data pieces corresponding to the plurality of instructions recognized by the information processing apparatus.

2. The information processing apparatus according to claim 1, wherein the input positions are input by touching the input area, and wherein the first condition is a condition that a long touch is performed in the input area.

3. The information processing apparatus according to claim 1, wherein the one or more processors, when executing the instructions, further causes the information processing apparatus to function as a scroll control unit configured to determine whether the first condition is satisfied by the initial portion of the series of input positions obtained by the obtainment unit, and wherein the scroll control unit determines that the first condition is satisfied in a case that the initial portion of the series of input positions periodically obtained by the obtainment unit indicates that a touched position on the input area remains within a predetermined range in the input area for a predetermined time period.

4. The information processing apparatus according to claim 1, wherein the second condition is a condition that a length of a first stroke of the two or more strokes constituted of input positions input after the first condition is satisfied is shorter than a predetermined length.

5. The information processing apparatus according to claim 4, wherein the input positions are input by touching the input area, and the first stroke among the two or more strokes consists of input positions input from a time when the first condition is satisfied to a time of releasing the touch from the input area.

6. The information processing apparatus according to claim 1, wherein the second condition is a condition regarding a length of a first stroke of the two or more strokes constituted of input positions input after the first condition is satisfied.

7. The information processing apparatus according to claim 1, wherein the second condition is a condition regarding a degree of bend of a first stroke of the two or more strokes constituted of input positions input after the first condition is satisfied.

8. The information processing apparatus according to claim 1, wherein the obtainment unit is configured to obtain a touched position detected by a touch sensor in a period from when the input area is touched with an object to when the object is released, and wherein the recognition unit determines, at a timing when the object is released from the input area, whether a shape of the two or more strokes constituted of input positions input after the first condition is satisfied forms one of the figures included in the plurality of dictionary data pieces corresponding to the plurality of instructions recognized by the information processing apparatus.

9. The information processing apparatus according to claim 1, wherein the display control unit displays a movement locus of input positions periodically obtained by the obtainment unit on the display screen, and further changes at least any one of colors, brightness, and shades of the locus in response to that the first condition is satisfied.

10. The information processing apparatus according to claim 1, wherein the one or more processors, when executing the instructions, further causes the information processing apparatus to function as an identification unit configured to identify input positions input after the first condition is satisfied among the series of input positions as a candidate for input positions constituting one of the figures included in the plurality of dictionary data pieces, wherein the recognition unit determines whether a shape of two or more strokes of the input positions identified as the candidate is similar to each of the figures.

11. The information processing apparatus according to claim 1, wherein the recognition unit is configured to recognize, in case of determination that the shape of the first stroke of the two or more strokes is not similar to any one of the first stroke of the figures included in the dictionary data pieces and a length of the first stroke of the two or more strokes is shorter than a predetermined length, the instruction based on a comparison between (a) a shape formed by the two or more strokes excluding the first stroke and (b) the shapes of the figures included in the plurality of dictionary data pieces.

12. The information processing apparatus according to claim 11,
wherein the input positions are input by touching the input area, and the first stroke among the two or more strokes consists of input positions input from a time when the first condition is satisfied to a time of releasing the touch from the input area.

13. A method for controlling an information processing apparatus, the method comprising:
obtaining input positions input and periodically detected on an input area;
determining whether a first condition is satisfied by an initial portion of a series of the obtained input positions;
scrolling at least a portion of an image displayed on a display screen in response to movement of an obtained input position;
storing a plurality of dictionary data pieces corresponding to a plurality of instructions recognized by the information processing apparatus, wherein the plurality of dictionary data pieces includes figures constituted of two or more strokes;
recognizing an instruction corresponding to a figure based on a comparison between a shape of two or more strokes constituted of input positions input after the first condition is satisfied by the initial portion of the series of input positions obtained by the obtaining and shapes of the figures included in the plurality of dictionary data pieces;
wherein the recognizing includes determining whether a shape of a first stroke of the two or more strokes is similar to each of a first stroke of the figures included in the dictionary data pieces, and recognizing, in case of determination that the shape of the first stroke of the two or more strokes is similar to any one of the first stroke of the figures included in the dictionary data pieces, the instruction based on a comparison between a shape formed by all of the two or more strokes including the first stroke and the shapes of the figures included in the plurality of dictionary data pieces; and
not scrolling the image in response to movement of an input position input after the first condition is satisfied,
wherein the recognizing further determines, in case of determination that the shape of the first stroke of the two or more strokes is not similar to any one of the first stroke of the figures included in the dictionary data pieces, whether a second condition is satisfied by the first stroke of the two or more strokes constituted of input positions input after the first condition and, in case of determination that the second condition is satisfied, excludes the first stroke from a target of processing for determining whether the target forms one of the figures included in the plurality of dictionary data pieces corresponding to the plurality of instructions recognized by the information processing apparatus.

14. An information processing apparatus comprising:
one or more processors which, when executing instructions, causes the information processing apparatus to function as:
an obtainment unit configured to obtain input positions input and periodically detected on an input area;
a display control unit configured to scroll at least a portion of an image displayed on a display screen in response to movement of an input position obtained by the obtainment unit;
a storage unit configured to store a plurality of dictionary data pieces corresponding to a plurality of instructions recognized by the information processing apparatus, wherein the plurality of dictionary data pieces includes figures constituted of two or more strokes; and
a recognition unit configured to recognize an instruction corresponding to a figure based on a comparison between a shape of two or more strokes constituted of input positions input after a first condition is satisfied by an initial portion of a series of input positions obtained by the obtainment unit and shapes of the figures included in the plurality of dictionary data pieces,
wherein, the display control unit does not scroll the image in response to movement of an input position input after the first condition is satisfied,
wherein the recognition unit is configured to recognize, in case of determination that the length of the first stroke of the two or more strokes is shorter than the predetermined length, an instruction corresponding to the figure based on a comparison between (a) a shape formed by the two or more strokes excluding the first stroke and (b) the shapes of the figures included in the plurality of dictionary data pieces, and
wherein the recognition unit is configured to recognize, in case of determination that the length of first stroke of the two or more strokes is not shorter than the predetermined length, the instruction based on a comparison between (c) a shape formed by all of the two or more strokes including the first stroke and (b) the shapes of the figures included in the plurality of dictionary data pieces.

15. The information processing apparatus according to claim 14,
wherein the input positions are input by touching the input area, and the first stroke among the two or more strokes consists of input positions input from a time when the first condition is satisfied to a time of releasing the touch from the input area.

16. A method for controlling an information processing apparatus, the method comprising:
obtaining input positions input and periodically detected on an input area;
scrolling at least a portion of an image displayed on a display screen in response to movement of an obtained input position;
storing a plurality of dictionary data pieces corresponding to a plurality of instructions recognized by the information processing apparatus, wherein the plurality of dictionary data pieces includes figures constituted of two or more strokes;
recognizing an instruction corresponding to a figure based on a comparison between a shape of two or more strokes constituted of input positions input after a first condition is satisfied by an initial portion of a series of input positions obtained by the obtaining and shapes of the figures included in the plurality of dictionary data pieces; and
not scrolling the image in response to movement of an input position input after the first condition is satisfied,
wherein the recognizing recognizes, in case of determination that the length of the first stroke of the two or more strokes is shorter than the predetermined length, an instruction corresponding to the figure based on a comparison between (a) a shape formed by the two or more strokes excluding the first stroke and (b) the shapes of the figures included in the plurality of dictionary data pieces, and wherein the recognizing recognizes, in case of determination that the length of first stroke of the two or more strokes is not shorter than the predetermined length, the instruction based on a comparison between (c) a shape formed by all of the two or more strokes including the first stroke and (b) the shapes of the figures included in the plurality of dictionary data pieces.

* * * * *